(12) United States Patent
Handerek

(10) Patent No.: US 12,281,933 B2
(45) Date of Patent: Apr. 22, 2025

(54) DISTRIBUTED OPTICAL FIBRE SENSOR

(71) Applicant: VIAVI SOLUTIONS INC., Chandler, AZ (US)

(72) Inventor: Vincent Handerek, Grays (GB)

(73) Assignee: VIAVI SOLUTIONS INC., Chandler, AZ (US)

( * ) Notice: Subject to any disclaimer, the term of this patent is extended or adjusted under 35 U.S.C. 154(b) by 360 days.

(21) Appl. No.: 17/796,496

(22) PCT Filed: Jan. 12, 2021

(86) PCT No.: PCT/GB2021/050063
§ 371 (c)(1),
(2) Date: Jul. 29, 2022

(87) PCT Pub. No.: WO2021/152287
PCT Pub. Date: Aug. 5, 2021

(65) Prior Publication Data
US 2023/0228616 A1    Jul. 20, 2023

(30) Foreign Application Priority Data
Jan. 31, 2020 (GB) ..................................... 2001356

(51) Int. Cl.
*G01H 9/00* (2006.01)
*G01D 5/353* (2006.01)

(52) U.S. Cl.
CPC ......... *G01H 9/004* (2013.01); *G01D 5/35361* (2013.01); *G01D 5/35364* (2013.01)

(58) Field of Classification Search
CPC . G01D 5/35361; G01D 5/35364; G01H 9/004
See application file for complete search history.

(56) References Cited

U.S. PATENT DOCUMENTS 10,247,584 B2    4/2019   Crickmore et al.
2013/0271769 A1* 10/2013 Handerek .......... G01D 5/35383
                                                                   356/446
(Continued)

FOREIGN PATENT DOCUMENTS

| CN | 104568119 A | 4/2015 |
| CN | 104677321 A | 6/2015 |

(Continued)

OTHER PUBLICATIONS

Chapeleau et al., "Instrumentation by distributed optical fiber sensors of a new ballastless track structure," *Geophysical Research Abstracts*, 15, 1 p. (2013).

(Continued)

*Primary Examiner* — Walter L Lindsay, Jr.
*Assistant Examiner* — Andrew V Do
(74) *Attorney, Agent, or Firm* — Mannava & Kang, P.C.

(57) ABSTRACT

A distributed optical fibre sensor is described which is arranged to measure one or more parameters as functions of position along a sensing optical fibre that extends along a path through an environment. The sensor includes a first probe light source arranged to generate pulses of first probe light in one or more first wavelength bands, a second probe light source arranged to generate pulses of second probe light in one or more second wavelength bands separate from said first wavelength bands, a wavelength division multiplexer arranged to launch the first probe light pulses and the second probe light pulses into the sensing optical fibre for backscatter within the sensing optical fibre, and a receiver arranged to receive and separately detect both Raman shifted components of the backscattered probe light, and coherent Rayleigh backscattered components of the second probe light.

50 Claims, 5 Drawing Sheets

(56) References Cited

U.S. PATENT DOCUMENTS

| | | | |
|---|---|---|---|
| 2016/0161633 | A1 | 6/2016 | Barfoot et al. |
| 2018/0223647 | A1 | 8/2018 | Johnston |
| 2019/0170593 | A1 | 6/2019 | Mitchell et al. |
| 2021/0190550 | A1* | 6/2021 | Handerek .......... G01D 5/35361 |

FOREIGN PATENT DOCUMENTS

| | | |
|---|---|---|
| CN | 104677421 A | 6/2015 |
| CN | 109891197 A | 6/2019 |
| CN | 110470327 A | 11/2019 |
| EP | 3249366 A1 | 11/2017 |
| RU | 192122 U1 | 9/2019 |
| WO | WO 87/07014 A2 | 11/1987 |
| WO | WO 2004/073172 A2 | 8/2004 |
| WO | WO 2008/056143 A1 | 5/2008 |
| WO | WO 2010/036360 A2 | 4/2010 |
| WO | WO 2012/063066 A2 | 5/2012 |
| WO | WO 2019/224511 A1 | 11/2019 |

OTHER PUBLICATIONS

Chapeleau et al., "Study of ballastless track structure monitoring by distributed optical fiber sensors on a real-scale mockup in laboratory," *Engineering Structures*, 56: 1751-1757 (Sep. 4, 2013).

Dakin, "Distributed Optical Fiber Sensors," *Fiber Optic Sensors: A Critical Review, Proc. of SPIE*, 10266: 162-199 (2017).

Hartog, "6.3 Differential Phase-Measuring DVS (dϕ-DVS)" in *An Introduction to Distributed Optical Fibre Sensors*, CRC Press, Boca Raton, FL, pp. 239-256 (2017).

Iribas et al., "Cyclic coding for Brillouin optical time-domain analyzers using probe dithering," *Optics Express*, 25(8): 8787-8800 (Apr. 17, 2017).

Kersey et al., "Distributed and multiplexed fibre-optic sensor systems," *J. of the Institution of Electronic and Radio Engineers*, 58(5S) : S99-S111 (1988).

Koyamada et al., "Fiber-optic Distributed Strain and Temperature Sensing with Very High Measurand Resolution Over Long Range Using Coherent OTDR," *J. Lightwave Technology*, 27(9): 1142-1146 (May 1, 2009).

Liao et al., "Harnessing oversampling in correlation-coded OTDR," *Optics Express*, 27(2): 1693-1705 (Jan. 21, 2019).

Liao et al., "Harnessing oversampling in correlation-coded OTDR," *Optics Express*, 27(2): 7 pp. (2019).

Lu et al., "Distributed optical fiber sensing: Review and perspective," *Applied Physics Reviews*, 6(4): 041302: 35 pp. (Oct. 11, 2019).

Muanenda et al., "Hybrid distributed acoustic and temperature sensor using a commercial off-the-shelf DFB laser and direct detection," *Optics Letters*, 41(3): 587-590 (Jan. 29, 2016).

Muanenda et al., "A Cost-Effective Distributed Acoustic Sensor Using a Commercial Off-the-Shelf DFB Laser and Direct Detection Phase-OTDR," *IEEE Photonics J.*, 8(1): 1-10 (Feb. 2016).

Pastor-Graells et al., "Single-shot distributed temperature and strain tracking using direct detection phase-sensitive OTDR with chirped pulses," *Optics Express*, 24(12): 13121-13133 (Jun. 7, 2016).

Rosolem et al., "Raman DTS Based on OTDR Improved by Using Gain-Controlled EDFA and Pre-Shaped Simplex Code," *IEEE Sensors J.*, 17(11): 3346-3353 (Jun. 1, 2017).

Wang et al., "Enhancing the performance of BOTDR based on the combination of FFT technique and complementary coding," *Optics Express*, 25(4): 3504-3513 (Feb. 20, 2017).

United Kingdom Intellectual Property Office, Search Report in United Kingdom Patent Application No. GB2001356.1, 2 pp. (Jul. 28, 2020).

European Patent Office, International Search Report in International Patent Application No. PCT/GB2021/050063, 7 pp. (Jul. 21, 2021).

European Patent Office, Written Opinion in International Patent Application No. PCT/GB2021/050063, 10 pp. (Jul. 21, 2021).

"EPO Communication under Rule 71(3) EPC (Intention to grant)", mailed Sep. 5, 2024, 7 pages. (References cited herewith XP40424545 and XP55823718 are listed in the Annexes on p. 5).

M. C. Farries et al., "Distributed temperature sensor using holmium-doped optical fiber", Optical Fiber Communication/International Integrated Optics and Optical Fiber Communication Conference, Jan. 19-22, 1987, 2 pages, (cited reference code XP55823718 in EPO letter of Intention to grant).

"48th International Wire & Cable Symposium-1999", (Year 1999), 913 pages (cited reference code XP40424545 in the EPO letter of Intention to grant).

* cited by examiner

DISTRIBUTED OPTICAL FIBRE SENSOR

CROSS-REFERENCE TO RELATED APPLICATIONS

This application is a national phase application of International Patent Application No. PCT/GB2021/050063, filed Jan. 12, 2021, which claims priority to Great Britian Patent Application No. GB 2001356.1, filed Jan. 31, 2020, both of which are incorporated by reference herein in their entireties for all purposes.

The present disclosure relates to a distributed optical fibre sensor arranged to detect both Raman and coherent Rayleigh backscattered components of probe light backscattered within a sensing optical fibre, and to determine one or more parameters as functions of position along the sensing optical fibre from the detected components of probe light. One of the parameters may be temperature determined from Raman scattered components of probe light.

INTRODUCTION

Distributed optical fibre sensors are designed to acquire information about an environment within which a sensing optical fibre is deployed, in particular as parameters determined as functions of position along the optical fibre. These parameters are typically determined by launching pulses of probe light into the sensing optical fibre, and detecting characteristics of the probe light as backscattered from the native material of the sensing optical fibre to an interrogator. Various techniques are known for determining temperature as such a parameter, for example using Raman or Brillouin scattering. Coherent Rayleigh scattering, in which small changes in refractive index occurring within the fibre give rise to changing interference patterns at the interrogator, is frequently used for example in the detection of acoustic vibration and other parameters.

The invention seeks to address limitations of the related prior art.

SUMMARY OF THE INVENTION

The performance of a coherent Rayleigh scattering based distributed optical fibre sensor, for example to detect phase shifts in a sensing optical fibre system due to temperature and/or strain changes, depends critically on the performance of the optical source and the modulation applied to its output radiation. In particular, wavelength stability and phase noise spectrum may be important features of the source itself and peak power and extinction ratio may be key features of modulation patterns used in the case of simple OTDR (optical time domain reflectometry) systems. In contrast, Raman based distributed optical fibre temperature sensing is typically more tolerant of optical source performance, working best with relatively wide source linewidth and higher peak power and being much more tolerant to slight changes in source wavelength.

The invention therefore provides a distributed optical fibre sensor employing different optical sources for each of the Raman and coherent Rayleigh scattering functions, thereby avoiding compromise in achieving the best performance for each method.

Phase shift sensing using coherent Rayleigh scattering can provide milli-Kelvin temperature resolution with milli-second response times, but tends to suffer from calibration difficulties. The invention therefore also provides temperature indication with high time and high temperature resolution based on processing of the coherent Rayleigh scattering signal, but with calibration and real time correction provided by parallel detection of temperature using lower time resolution Raman backscatter. Errors in temperature indication from the coherent Rayleigh signal can be due to processing imperfections, including phase unwrap errors in optical phase recovery, source wavelength instability or strain changes in the sensing fibre.

Conversely, if the sensing optical fibre is also subject to strain variations, then a phase change measured from the coherent Rayleigh scattering can be adjusted for temperature changes determined from the Raman backscatter signal to derive a corrected measurement of strain along the sensing optical fibre.

The invention therefore provides a distributed optical fibre sensor for measuring one or more parameters as functions of position along a sensing optical fibre that extends along a path through an environment, comprising: a first probe light source arranged to generate pulses of first probe light in one or more first wavelength bands; a second probe light source arranged to generate pulses of second probe light in one or more second wavelength bands separate from said first wavelength bands; a wavelength division multiplexer arranged to launch the first probe light pulses and the second probe light pulses into the sensing optical fibre for backscatter within the sensing optical fibre; and a receiver arranged to receive and separately detect both Raman shifted components of the backscattered probe light, and coherent Rayleigh backscattered components of the second probe light.

The detected Raman shifted components will typically be strongly dominated by contributions from the first probe light pulses, and detection of the Raman shifted components of the backscattered probe light may therefore be said to be or to comprise detection of the Raman shifted components of the backscattered first probe light. However, depending on the wavelength, coding and other characteristics of the first and second probe light, backscattered elements of the second probe light may typically make some small, often insignificant contribution to the detected Raman shifted components.

Options for implementation of the one or more first wavelength bands, and the one or more second wavelength bands are discussed below, but generally where multiple wavelength bands of a particular type (for example first wavelength bands) are discussed this indicates that these are multiple, non-overlapping, non-contiguous bands which are spaced apart from each other in wavelength. The first wavelength bands may be non-overlapping with, and optionally also spaced from, the second wavelength bands.

The distributed optical fibre sensor may further comprise an analyser as discussed below to determine said one or more parameters from the detected Raman shifted components and detected coherent Rayleigh components of the backscattered probe light. Some such parameters may be determined from only one of the Raman or Rayleigh components, for example a temperature parameter determined from only the Raman backscatter, or a vibration parameter determined from only the Rayleigh backscatter. Other such parameters may be enhanced parameters which are determined from both the Raman and Rayleigh backscatter, such as enhanced measures of temperature or strain.

The Rayleigh backscattered light may be analysed to determine optical phase shifts in the coherent Rayleigh backscattered components of the second probe light. These determined optical phase shifts can then be used for a variety of purposes for example to determine acoustic vibration as a function of position along the path, to provide enhancements in measurements of temperature based on the Raman shifted components, or to determine strain in the sensing optical fibre which may then be compensated for effects of temperature on the optical phase shifts through use of the detected Raman shifted components. The detection of temperature as a function of position along a sensing optical fibre, including using the various techniques described herein, may be referred to as distributed temperature sensing.

When acoustic vibration is referred to, this may for example be over suitable frequency ranges for example at frequencies above 1 Hz or above 10 Hz, and relate to acoustic modes of vibration which impinge on the sensing optical fibre from the environment. Determination of acoustic vibration using backscatter, as a function of position along a sensing optical fibre, including in the various ways described in this document, may be referred to as distributed acoustic sensing. When determination of strain is instead referred to, this may typically refer to non-acoustic modes of strain imposed on the sensing optical fibre by the environment. Characteristic frequencies of changes in such strain make take place for example at frequencies below 1 Hz or below 0.1 Hz.

Aspects described herein therefore disclose, among other combinations, a distributed optical fibre sensor which provides both a distributed acoustic sensor and a distributed temperature sensor.

The distributed optical fibre sensor may further comprise an optical circulator, wherein the pulses of first and second probe light are launched into the sensing optical fibre from the wavelength division multiplexer through the optical circulator, and backscattered components of the first and second probe light, which have been backscattered within the sensing optical fibre, are received at the receiver through the optical circulator.

The distributed optical fibre sensor may further comprise one or more optical conditioning elements, each optical conditioning element being arranged to condition pulses of both first probe light and pulses of second probe light passing from the wavelength division multiplexer to the optical circulator. In this way common conditioning elements can be used for both first and second probe light pulses, reducing cost and complexity of the sensor. For example, the common optical conditioning elements may comprise one or more of: a fibre amplifier such as an erbium doped fibre amplifier, and an optical filter. In order to use a common fibre amplifier, the first and second wavelength bands may need to lie within an amplification range or band of the amplifier as discussed further below.

The receiver may comprise one or more Rayleigh wavelength filters arranged to select backscattered probe light in said one or more second wavelength bands, and one or more Rayleigh photodetectors arranged to detect said selected backscattered probe light in said one or more second wavelength bands. The receiver may also comprise one or more Raman wavelength filters arranged to select Raman shifted components of said probe light, in particular of the second probe light pulses, and one or more corresponding Raman photodetectors arranged to detect said selected Raman shifted components.

The one or more Raman wavelength filters may in particular comprise a Stokes wavelength filter arranged to select Raman Stokes shifted components of said probe light and an anti-Stokes wavelength filter arranged to select Raman anti-Stokes shifted components of said probe light, and wherein the one or more corresponding Raman photodetectors comprise a Stokes photodetector arranged to detect said selected Raman Stokes shifted components and an anti-Stokes photodetector arranged to detect said selected Raman anti-Stokes shifted components.

The first probe light source and the second probe light source may comprise respective one or more first lasers and one or more second lasers.

At least one of the first wavelength bands may be separated from the, or from each of the one or more second wavelength bands by less than 50 nm, for example so as to facilitate amplification by a common fibre amplifier as touched on above.

The bandwidth of each of the pulses of first probe light may be at least one of: at least 100 MHz; and at least 1 GHz. These broader bandwidths enable higher power pulses of probe light to be used for Raman scatter sensing, while avoiding instabilities and deleterious stimulated non-linear optical propagation effects. In contrast, the bandwidth of each of the pulses of second probe light may be at least one of: less than 100 MHz; less than 10 MHz; and less than 1 MHz, so as to provide sufficient coherence for detection of coherent Rayleigh backscatter. The peak power of each pulse of first probe light may for example be at least 1 Watt and the peak power of each pulse of second probe light may for example be less than 500 milliwatts.

The distributed optical fibre sensor may be provided with a timing controller or some other means for controlling timing and modulation of the first and second light pulses as set out below. For example, the distributed optical fibre sensor may be arranged such that backscattered first probe light and backscattered second probe light coexists within the sensing optical fibre, through suitable launch times of the respective pulses into the fibre, and the receiver may then be arranged to separately and simultaneously detect both Raman shifted components of the backscattered probe light, and coherent Rayleigh backscattered components of the second probe light. Being able to detect both the Raman and coherent Rayleigh scatter at the same time enables both of these signals to be measured at a higher rate, increasing the duty cycle and efficiency of the sensor.

However, the distributed optical fibre sensor is preferably arranged such that the first and second probe light pulses do not overlap during launch into the sensing optical fibre, to avoid non-linear interactions which can particularly reduce the efficacy of the coherent Rayleigh functions of the sensor.

The distributed optical fibre sensor may be arranged to implement pulse code modulation of the first probe light source, so as to launch one or more code sequences of pulses of first probe light into the sensing optical fibre, and to reconstruct the detected Raman shifted components of the backscattered light as functions of position along the path using decoding of the pulse code modulation. In this way the signal to noise ratio of the Raman function of the sensor can be improved and/or integration times reduced, without significant impact on the spatial resolution of the sensor. One or more pulses of second probe light may be interleaved within such a code sequence of first probe light, for example in zero bits or inter-bit spacings of the code.

The receiver may be arranged to separately and simultaneously detect both Raman Stokes shifted components of the backscattered probe light, and Raman anti-Stokes shifted components of the backscattered probe light, which may arise from the same pulses of first probe light and/or from first probe light of the same first wavelength band.

However, in some arrangements, the one or more first wavelength bands may comprise both first and second instances of the first wavelength bands, and wherein the receiver is arranged to detect Raman anti-Stokes shifted components of the backscattered light arising from probe light pulses of only the first of the first wavelength bands, and wherein the receiver is arranged to detect Raman Stokes shifted components of the backscattered light arising from probe light pulses of only the second of the first wavelength bands.

More particularly, the detected Raman anti-Stokes shifted components of the backscattered light and the second of the first wavelength bands may be coincident in or overlap in wavelength, or may be separated in wavelength by less than 20 nanometres. Similarly, the detected Raman Stokes shifted components of the backscattered light and the first of the first wavelength bands may be coincident in or overlap in wavelength, or may be separated in wavelength by less than 20 nanometres. In this way, the attenuation characteristics experienced over the outward and backscattered paths of probe light pulses of the first of the first wavelength bands is approximately matched by the attenuation characteristics experienced over the outward and backscattered paths of probe light pulses of the second of the first wavelength bands, making temperature determination from the Stokes and anti-Stokes measurements more stable and accurate.

Separate pulse code modulation may also be used for the separate the Stokes and anti-Stokes signals. For example, the distributed optical fibre sensor may be arranged to provide pulse code modulation of the first probe light source so as to launch code sequences of pulses of the first probe light into the sensing optical fibre, and a decoder arranged to reconstruct the detected Raman shifted components of the backscattered light as functions of position along the path using decoding of the pulse code modulation, wherein first probe light pulses of the first of the first wavelength bands are launched into the sensing optical fibre and subsequently decoded using a first modulation pulse code, and the first probe light pulses of the second of the first wavelength bands are launched into the sensing optical fibre and subsequently decoded using a second modulation pulse code different to said first modulation pulse code. This scheme may in particular be used if wavebands are arranged such that the Stokes and anti-Stokes light to be detected overlaps or is coincident, or if the Stokes and/or anti-Stokes light to be detected is coincident in wavelength with the Rayleigh backscatter from the second wavelength band or bands, to permit separation of these components during decoding.

If first and second first wavelength bands are separated as described above, then it may not be appropriate or possible to use one or more of the common optical conditioning elements for both of the first and second first wavelength bands. In this case, one or more common optical conditioning elements may be arranged to condition first probe light pulses in only one of the first and second first wavelength bands. For example, the common optical conditioning elements may be arranged not to condition first probe light pulses in the second of the first wavelength bands which is used for detection of Stokes shifted components, and other, separate optical conditioning elements maybe used instead.

As noted above, the distributed optical fibre sensor may comprise an analyser arranged to determine said one or more parameters using the detected Raman shifted components and/or coherent Rayleigh components of the backscattered probe light. The analyser may be implemented in, partly in, or external to an interrogator housing the probe light sources and other optical components. The analyser may typically be implemented using computer software executing on one or more suitable computer processors, for example with associated volatile and non-volatile memory, data communications such as network interfaces, input and output peripherals such as display screens and keyboard, and so forth. The invention therefore also provides such software arranged to implement the described analysis processes carried out by the analyser, one or more computer readable media carrying such computer software, and computer implemented methods of carrying out the described analysis.

More particularly, each parameter may be determined as a function of position along the path or sensing optical fibre. The analyser may be arranged to determine a temperature parameter from only the Raman backscatter, and/or a vibration parameter determined from only the Rayleigh backscatter. Other such parameters may be enhanced parameters which are determined from both the Raman and Rayleigh backscatter, such as enhanced measures of temperature or strain.

To this end, the analyser may be arranged to determine a temperature parameter, as a function of position along the path, from the detected Raman shifted components of the backscattered probe light, for example from combinations of, such as a ratio of, detected or decoded Stokes and detected or decoded anti-Stokes shifted components of the backscattered probe light.

The analyser may be arranged to determine acoustic vibration as a function of position along the path from the coherent Rayleigh backscattered components of the second probe light. Such an acoustic vibration parameter may be determined for example directly from changes in the coherent Rayleigh backscatter signal between successive probe light pulses. The analyser may also or instead be arranged to determine optical phase shifts in the coherent Rayleigh backscattered components of the second probe light as a function of position along the path. Such phase shifts may then be representative of changes in refractive index of the fibre, and therefore of temperature and/or strain.

The analyser may be arranged to calculate an enhanced temperature parameter, as a time series of temperature at each of a plurality of positions along the path, by combining lower time resolution determinations of temperature, determined from said detected Raman shifted components of the backscattered probe light, with higher time resolution determinations of temperature changes, determined from the coherent Rayleigh backscattered components of the second probe light. The lower time resolution determinations of temperature could for example have a time resolution of longer than one second, or longer than 10 seconds, and the higher time resolution determinations of temperature changes could have a time resolution of shorter than one second, or shorter than 0.1 seconds. Such an enhanced measure of temperature may for example be determined where the sensing optical fibre is largely isolated from strain in the local environment, for example by being disposed in a loose tube or similar structure.

Similarly, the analyser may be arranged to calculate an enhanced temperature parameter, as a time series of temperature at each of a plurality of positions along the path, by combining lower temperature resolution determinations of temperature, determined from said detected Raman shifted components of the backscattered probe light, with higher temperature resolution determinations of temperature changes, determined from the coherent Rayleigh backscattered components of the second probe light. For example, the lower resolution determinations of temperature may have a temperature resolution of no better than 0.5 Kelvin, or no better than 0.1 Kelvin, and the higher temperature resolution determinations of temperature changes may have a precision of better than 0.1 Kelvin, or better than 0.05 Kelvin.

If the sensing optical fibre is subject to strain imposed by the local environment, then the analyser may be arranged to determine an enhanced strain parameter, typically as a time series at each of a plurality of positions along the path, by using said coherent Rayleigh backscattered components of the second probe light with said determinations of temperature which result from said Raman shifted components of the backscattered probe light. For example, the analyser may be arranged to determine strain as a function of position along the path from optical phase shifts determined in the coherent Rayleigh backscattered components of the second probe light, wherein the determination of strain is compensated for the effect of temperature on the optical phase shifts using the temperature determined from the detected Raman shifted components of the backscattered probe light.

The invention also provides methods corresponding to the described apparatus, for example a method of measuring one or more parameters as functions of position along a sensing optical fibre that extends along a path through an environment, comprising: using a first probe light source to generate pulses of first probe light in one or more first wavelength bands; using a second probe light source to generate pulses of second probe light in one or more second wavelength bands separate from said first wavelength bands; launching the first probe light pulses and the second probe light pulses into the sensing optical fibre for backscatter within the sensing optical fibre; and receiving, and separately detecting, both Raman shifted components of the backscattered probe light, and coherent Rayleigh backscattered components of the second probe light.

The method may comprise determining optical phase shifts in the coherent Rayleigh backscattered components of the second probe light, and may provide distributed acoustic sensing using these optical phase shifts or in other ways. If temperature is determined from the detected Raman shifted components, then the method may therefore provide both distributed temperature sensing and distributed acoustic sensing.

The method may further comprise using a single optical conditioning element to condition pulses of both first probe light and pulses of second probe light before launch into the sensing optical fibre, wherein the optical conditioning element is optionally an optical fibre amplifier.

The bandwidth of each of the pulses of first probe light may be at least one of: at least 100 MHz; and at least 1 GHz, and the bandwidth of each of pulses of second probe light may be at least one of: less than 100 MHz, less than 10 MHz, and less than 1 MHz.

The first and second probe light pulses may be launched into the fibre such that backscattered first probe light and backscattered second probe light coexists within the sensing optical fibre, but preferably such that the first and second probe light pulses do not overlap during launch into the sensing optical fibre. The receiver may be operated to separately and simultaneously detect both Raman shifted components of the backscattered probe light.

The method may comprise separately and simultaneously detecting both Raman Stokes shifted components of the backscattered probe light and Raman anti-Stokes shifted components of the backscattered probe light, wherein the detected Raman Stokes shifted components of the backscattered probe light, and the detected Raman anti-Stokes shifted components of the backscattered probe light arise from the same pulses of first probe light and/or from first probe light of the same first wavelength band.

However, the one or more first wavelength bands may comprise both first and second first wavelength bands, and the method may then instead comprise detecting Raman anti-Stokes shifted components of the backscattered light arising from probe light pulses of only the first of the first wavelength bands, and detecting Raman Stokes shifted components of the backscattered light arising from probe light pulses of only the second of the first wavelength bands. Optionally the detected Raman anti-Stokes shifted components of the backscattered light and the detected Raman Stokes shifted components of the backscattered light may be coincident in or overlap in wavelength, or are separated in wavelength by less than 20 nanometres. However, in other arrangements, the detected Raman anti-Stokes shifted components of the backscattered light and the second of the first wavelength bands may be coincident in or overlap in wavelength, or may be separated in wavelength by less than 20 nanometres, and similarly, the detected Raman Stokes shifted components of the backscattered light and the first of the first wavelength bands may be coincident in or overlap in wavelength, or may be separated in wavelength by less than 20 nanometres.

The method may further comprise determining temperature as a function of position along the path from the detected Raman shifted components of the backscattered probe light, and optionally from combinations, such as a ratio, of detected or decoded Stokes and detected or decoded anti-Stokes shifted components of the backscattered probe light, noting that the Stokes and anti-Stokes shifted components could be separated in the interrogator by a pulse coded decoding scheme based on a signal from a single photodetector.

The method may further comprise using both the detected Raman shifted components and the detected coherent Rayleigh backscatter components to determine an enhanced parameter as a function of position along the sensing optical fibre. For example, such an enhanced parameter could be an enhanced measure of temperature combining lower time resolution determinations of temperature, determined from said detected Raman shifted components of the backscattered probe light, with higher time resolution determinations of temperature changes, determined from the coherent Rayleigh backscattered components of the second probe light. Another such enhanced parameter could also be an enhanced measure of strain, determined from said coherent Rayleigh backscattered components of the second probe light, combined with detected Raman shifted components of the backscattered probe light representative of temperature.

As noted above, the invention also provides computer program software arranged to carry out analysis as described herein using one or more computer systems, and one or more computer readable media carrying such software.

BRIEF SUMMARY OF THE DRAWINGS

Embodiments of the invention will now be described, by way of example only, and with reference to the accompanying drawings of which.

DETAILED DESCRIPTION OF EMBODIMENTS

Figure 1:
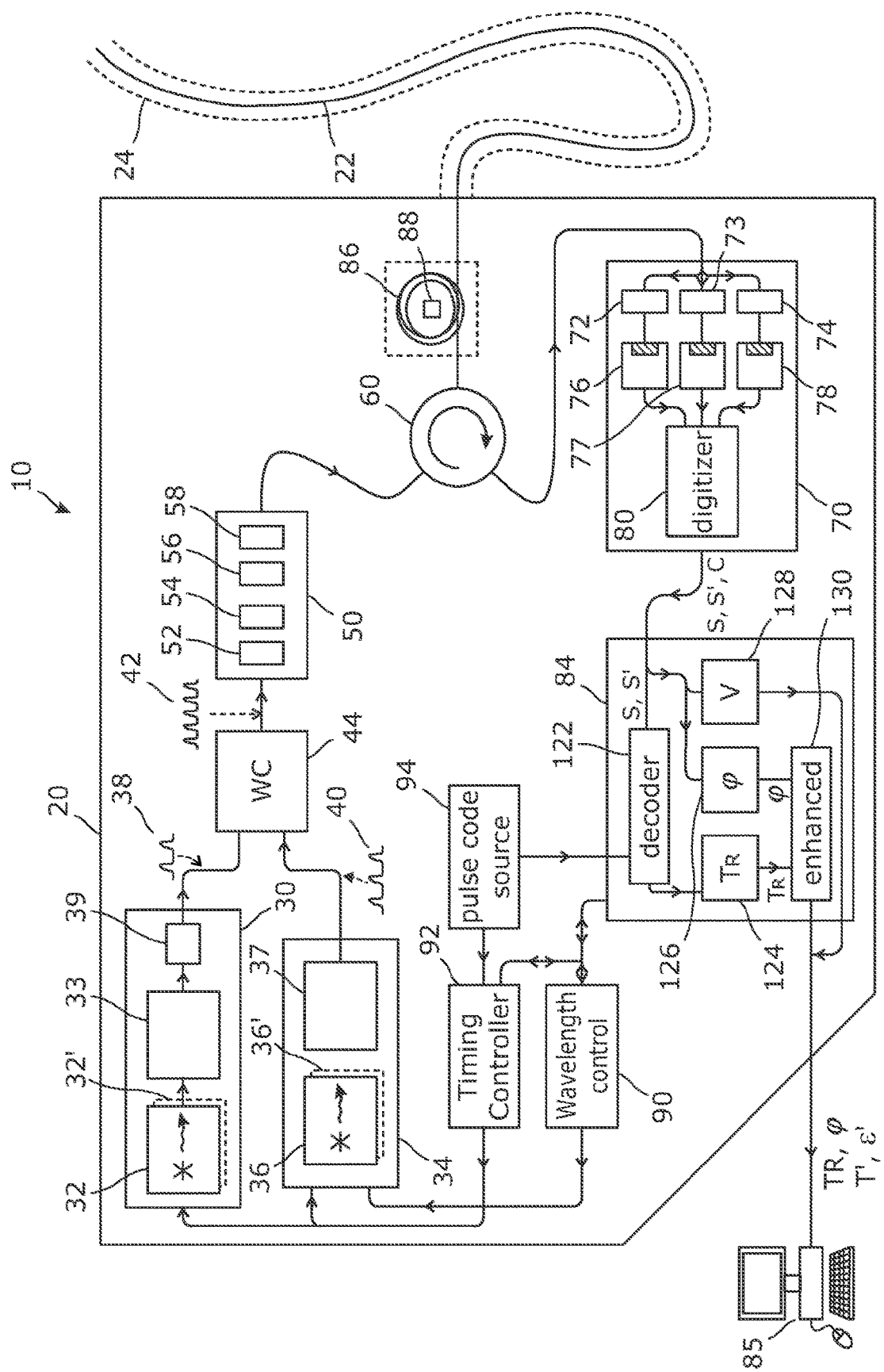
FIG. 1 illustrates schematically a distributed optical fibre sensor according to the invention in which an interrogator is used to launch first and second probe light pulses into a sensing optical fibre, and to receive and detect backscattered light.

Referring now to FIG. 1 there is shown a distributed optical fibre sensor 10 embodying the invention, and comprising an interrogator 20 coupled to a sensing optical fibre 22. The sensing optical fibre typical extends along a path 24 through an environment to be sensed, for example along a well bore, along a pipeline, through a building, around a security perimeter, or along a bridge, railway, fence, or other engineering structure.

The distributed optical fibre sensor is arranged to determine temperature, and optionally one or more other parameters of the environment, as functions of position along the sensing optical fibre 22 and therefore also along the path 24. This is achieved by directing probe light into the sensing optical fibre, and receiving back from the sensing optical fibre 22 backscattered components of that probe light which have been backscattered within, and from the material of, the sensing optical fibre 22.

Temperature is at least partly determined by detecting Raman Stokes shifted and anti-Stokes shifted components of the backscattered probe light, and combining these as discussed in more detail below. Additionally, coherent Rayleigh backscattered components of the probe light are detected and used for one or more purposes, which can include detection of vibration as a function of position along the sensing optical fibre 22, providing higher time resolution detail for the determination of temperature from the Raman shifted components, and providing a determination of strain as a function of position along the sensing optical fibre 22 where the determined strain is corrected for variations in temperature using the Raman shifted components.

To these ends, the interrogator 20 comprises at least a first probe light source 30 comprising at least one first laser 32, and a second probe light source 34 comprising at least one second laser 36. The first probe light source is arranged to generate first probe light pulses 38 falling within one or more first wavelength bands 102 (illustrated in FIG. 2), and the second probe light source 34 is arranged to generate second probe light pulses 40 falling within one or more second wavelength bands 104 (also illustrated in FIG. 2) which are separate to or spaced from said first wavelength bands 102 in terms of optical wavelength.

Probe light pulses from each of the probe light sources 30, 34 are combined into a single stream of pulses 42 using a wavelength combiner 44. The combined stream 42 of first and second probe light pulses 38, 40 may then be conditioned using optical conditioning elements 50, before being directed to a circulator 60 which directs the combined stream of probe light pulses to the sensing optical fibre 22. First and second wavebands 102, 104 and other aspects of a wavelength scheme which may be used, including aspects such as the Stokes and anti-Stokes backscatter components, are illustrated schematically in FIG. 2, noting that the various elements are not shown to scale.

Figure 2:
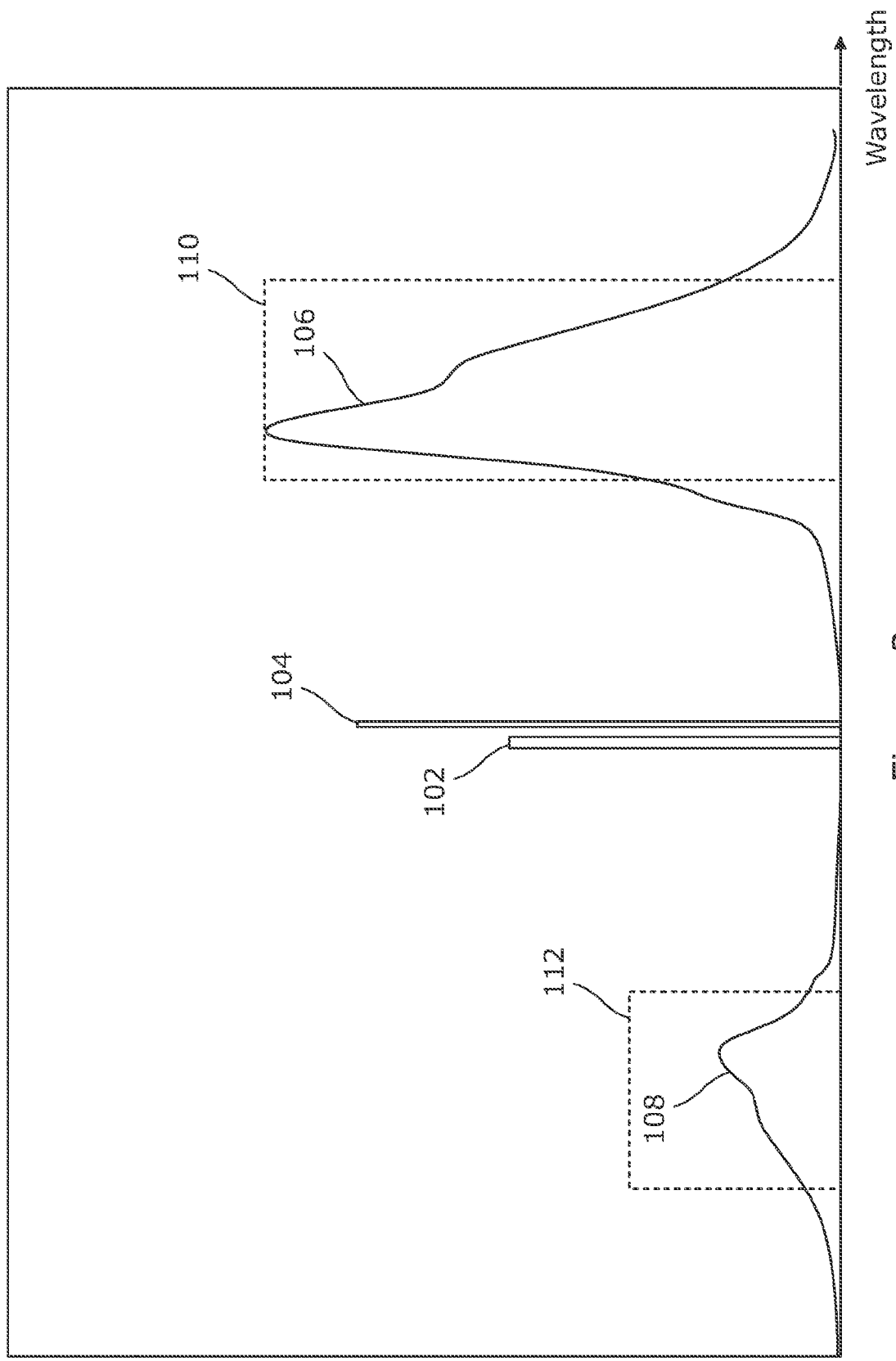
FIG. 2 shows a wavelength scheme for the first and second probe light pulses and backscattered light of FIG. 1.

The horizontal axis in FIG. 2 represents wavelength of the various transmitted and received light components. The vertical axis may be taken to represent intensity or power, at least of the received backscattered Stokes and anti-Stokes components 106, 108. The intensities of the first and second probe light within the bands labelled in FIGS. 2 as 102 and 104 would typically be very much greater than those of the Stokes and anti-Stokes backscattered components, by many orders of magnitude, even though for convenience these are shown diagrammatically in the same figure.

The optional use of one or more optical conditioning elements 50 common to both the first and second probe light pulses can be used to simplify construction of the interrogator 20. The common optical conditioning elements may comprise for example one or more optical amplification elements 52 such as an erbium doped optical amplifier, and one or more of attenuation 54, filtering 56, and polarisation control elements 58. One or more of the optical conditioning elements 50 may provide conditioning functions that are controllable so as to vary with time, for example such as a variable optical attenuator providing attenuation levels for the first probe light pulses 38 which are different to the attenuation levels for the second probe light pulses 40.

Transient distortion of the modulated pulse waveforms by the erbium doped optical amplifier may be avoided using various known approaches, such as preshaping of waveforms, pre-saturation of the amplifier by a pulsed source at another wavelength, amplifier parasitic lasing at a chosen wavelength, or by use of a transient-minimised amplifier design.

The first and second probe light pulses undergo backscatter within the sensing optical fibre 22 as discussed in more detail below, and the backscattered probe light is received back at the circulator 60 from where it is directed to a receiver 70 which is arranged to receive, and separately detect, Raman Stokes shifted components 106 of the backscattered probe light, Raman anti-Stokes shifted components 108 of the backscattered probe light, and coherent Rayleigh backscattered components of the second probe light. Typically, the second probe light pulses will give rise to only a small proportion of the detected Stokes and anti-Stokes shifted components which will be strongly dominated by scattered components of the first probe light for reasons discussed below. The detected coherent Rayleigh backscattered components arise only from the second probe light pulses 40 because the first probe light pulses lie in one or more wavebands which are separated from the detected coherent Rayleigh backscatter, and in any case the first probe light pulses will typically have bandwidths which are too broad to give rise to a significant coherent Rayleigh interference signal even within their own waveband 102.

The Stokes shifted components 106, anti-Stokes shifted components 108, and coherent Rayleigh backscattered components of the received backscattered light 62 may be separated and separately detected in the receiver 70 in various ways, but in the arrangement of FIG. 1 this is achieved using a respective Stokes wavelength filter 72 to selectively transmit or reflect the Stokes shifted backscattered components 106, an anti-Stokes wavelength filter 73 to selectively transit or reflect the anti-Stokes shifted backscattered components 108, and a Rayleigh wavelength filter 74 to selectively transmit or reflect the backscattered probe light in the second wavelength band 104. The transmitted or reflected light from each filter is then directed to a respective Stokes photodetector 76, anti-Stokes photodetector 77, and Rayleigh photodetector 78. The signals from these photodetectors are passed to a digitiser 80 for digitisation and subsequent output from the receiver 70. Such output may for example comprise a Stokes signal S', an anti-Stokes signal S' and a coherent Rayleigh noise signal C output by the receiver as illustrated in FIG. 1, and forwarded to the analyser 84 for further analysis and use.

For types of silica glass used in typical optical fibres, much of the Stokes and anti-Stokes backscattered components suitable for detection in the receiver 70 lie around 200 to 600 $cm^{-1}$ above and below the first wavelength band used to excite the Raman scatter. To this end, the Stokes wavelength filter 72 and anti-Stokes wavelength filter 73 may typically have broad bandpass or reflection band characteristics of around 20 nm or more in bandwidth, located roughly 100 nm above and below the wavelength of the first wavelength band 104. Example bandpass or reflection band characteristics are shown in FIG. 2 as bandpass region 110 for the Stokes wavelength filter and bandpass region 112 for the anti-Stokes wavelength filter. Calculation of temperature from the detected Stokes and anti-Stokes shifted components, as discussed below, does not need to rely on details of the Raman spectra, and use of relatively broad bandpass filters in this way enables more optical power to be detected than if the magnitudes of particular Raman bands were used.

The receiver 70 will typically comprise further components to provide functions such as optical and/or electronic gain, optical filtering, optical gating and so forth. These components will typically differ between the detection chains for the Stokes, anti-Stokes and Rayleigh detection functions, so as to optimise signal to noise ratio for each detection chain and signal.

The Stokes, anti-Stokes and Rayleigh wavelength filters 72, 73, 74 may be provided as a chain, for example in which the Rayleigh wavelength filter 74 first splits off the Rayleigh backscattered components of the second wavelength band which will typically form the strongest required part of the backscatter signal, the anti-Stokes filter 73 then splits off the anti-Stokes components which typically form the weakest required part of the backscatter signal, and the Stokes 72 filter then splits off the Stokes components. Some arrangements may for example use a chain of obliquely oriented filters, in which a beam of backscattered light passes through each filter in turn, and each filter directs a selected part of the light (coherent Rayleigh, Stokes, anti-Stokes) out of the main beam for detection.

The digitised signals from the photodetectors 76, 77, 78 may be received and analysed within the interrogator 20 using an analyser 84, and/or they may be one or more of: stored in memory, passed using a telecommunications network or other data connection, or provided in some other way, to one or more further computer systems such as the laptop or other personal computer 85 depicted in FIG. 1 which could be locally connected or remotely connected over a network, for analysis in order to determine temperature and optionally one or more other parameters as functions of position along the sensing optical fibre 22 as described in more detail below.

The one or more first wavelength bands 102, which are used for the pulses of first probe light and Raman scattering, and the one or more second wavelength bands 104, which are used for the pulses of second probe light and coherent Rayleigh scattering, are preferably arranged to be separate, that is not to overlap. This facilitates combination of the first and second probe light pulses of these wavelength bands by the wavelength combiner 44, and permits separate and simultaneous detection of backscatter as discussed above, in the receiver 70.

While avoiding spectral overlap, the wavelength bands 102, 104 can be chosen independently in order to optimise the performance of the respective Raman and coherent Rayleigh sensing functions. Typically, however, the wavelength bands may be chosen to lie within a range of about 30 to 50 nm in wavelength from each other to make it easier to provide common optical conditioning components 50, such as a single erbium doped fibre amplifier 52 for the probe light pulses of both of the first and second wavelength bands. The wavelength bands may also be chosen to avoid any significant Raman scattering of the first wavelength bands into the second wavelength bands.

Suitable wavebands may lie in the near infrared, for example in the region of 1540 nm. In order to use more cost effective "off the shelf" components, the first and second wavelength bands could fall within adjacent DWDM (dense wave division multiplexing) ITU channels such as channels 45 and 46 which are centred on 1541.35 and 1540.56 nm, or other non-adjacent ITU channels. Using such channels, the wavelength combiner 44 can be provided using a conventional DWDM component.

It is desirable to avoid stimulating non-linear scattering that could shift energy of the first light pulses 38 to new wavelengths. Such non-linear scattering could reduce fidelity of the expected Raman Stokes and anti-Stokes backscatter within the sensing optical fibre 22 for detection at the receiver, or could contaminate the coherent backscatter from the second pulses 40 in the second wavelength bands 104. To this end, the bandwidth of each first light pulse 38 should preferably correspond to a coherence length of the first laser 32 which is considerably shorter than the physical length of a first probe light pulse within the sensing optical fibre 22. Since such a pulse length may typically be of the order of 1 to 100 m to provide suitable spatial resolution in the determined temperature as a function of position along the sensing optical fibre, first probe light pulses each having a bandwidth of at least 100 MHz, and more preferably at least 1 GHz may be used. However, much larger pulse bandwidths for example corresponding substantially to the approximately 0.8 nm bandwidth of a single DWDM ITU channel, or broader with a bandwidth of for example several nm could be used.

On the other hand, in order to provide sufficiently coherent Rayleigh interference, in the form of a time varying speckle pattern intensity in the received backscattered second probe light, each second probe light pulse should preferably have a bandwidth which corresponds to a coherence length which is significantly longer than the physical length of a second probe light pulse 40 within the sensing optical fibre 22. Since such a pulse length may typically be of the order of 1 to 100 m to provide suitable spatial resolution in the detection of interference phase shifts as a function of position along the sensing optical fibre, each second probe light pulse may have a bandwidth of less than 100 MHz, or less than 10 MHz, and more preferably less than 1 MHz or less than 100 kHz. However, much smaller second pulse bandwidths for example around a few kHz may be used.

The bandwidth of the, or each, first wavelength band may correspond to a bandwidth of the probe light pulses of first probe light transmitted within that band, in particular if all of these probe light pulses have the same central wavelength. However as discussed below, it may be advantageous to use pulses of second probe light having a variety of different wavelengths, in which case a second wavelength band comprising multiple such wavelengths may be considerably broader than the bandwidth of a single one of those probe light pulses.

Raman scattering is a process with a small scattering cross section, and therefore the use of relatively higher power first probe light pulses is desirable, for example with each pulse having a peak power of at least 100 milliwatts, and more preferably at least 1 watt. The detection and use of Raman backscattered components of the probe light is also relatively insensitive to the exact output wavelength of the first probe light source, so that wavelength stability is not a key factor in selection of a suitable first laser 32 for use in the first probe light source 30, and as noted above a wide source linewidth can be used.

In contrast, the interference pattern resulting at the receiver 60 from coherent Rayleigh scatter of second probe light pulses is very sensitive to small changes in phase and wavelength of the second probe light pulses. Use of a second laser source 36 with very good phase and wavelength stability is therefore desirable, especially if techniques such as phase unwrapping which require low phase noise and phase stability over periods of seconds to minutes are to be used to determine optical phase shifts over time in the coherent Rayleigh backscatter. Extinction ratio between the peak pulse power and non-pulse periods is also important for signal to noise ratio, and very precise wavelength tuning may be required for example if relative phase bias techniques such as those outlined in WO2012/063066 are to be implemented. At the same time, the scattering cross section for coherent Rayleigh backscatter is more favourable than for Raman scattering, so that relatively lower power second probe light pulses may be used, for example having peak powers of less than about 500 milliwatts, or less than about 100 milliwatts.

The different requirements of the two techniques of Raman and coherent Rayleigh backscatter used by the arrangements of FIG. 1 can therefore best be served by the use of separate first and second probe light sources each comprising at least one distinct laser having suitable output properties as discussed above. The one or more first lasers may for example be provided by widely available low cost semiconductor lasers emitting within the band of any erbium doped fibre amplifier used in the conditioning components.

For some embodiments, it may be desirable to generate and launch into the sensing optical fibre 22 series or groups of second probe light pulses in which at least some of the different pulses have different wavelengths. Such schemes can be used for example to increase the time resolution (through increased repetition rate) or sensing fibre length range of the coherent Rayleigh detection, both of which are otherwise limited by round trip time of a single pulse within the fibre, by launching a second probe light pulse of a first wavelength and then launching another second probe light pulse of a second wavelength before all backscatter from the first wavelength has been received at the detector. More than two wavelengths can be used in this way to further increase performance. Such multiple wavelength schemes can also be used for example to obtain improved response characteristics in the coherent Rayleigh detection by using groups of wavelengths which provide controlled relative phase biases between the pulses of each wavelength, and for other purposes. Such schemes are described for example in WO2012/062066, the contents of which are incorporated herein by reference for explaining how such schemes may be implemented and for all other purposes.

To this end, although FIG. 1 primarily depicts the second probe light source as comprising one second laser 36, it may instead comprise more than one second laser 36 with each second laser (shown as 36, 36' in FIG. 1) being used to generate second light pulses of a different wavelength. In other arrangements, a single second laser 36, or each of multiple second lasers 36, 36' may be used to generate second probe light pulses of different wavelengths using suitable tuning techniques.

Typically, if second probe light pulses of multiple wavelengths are used then these wavelengths may be closely spaced, for example with wavelength spacings of just a few picometres. However, more widely spaced wavelengths may also be used so that referring to FIG. 2, there may be multiple distinct second wavelength bands 104 for the second probe light pulses, and one or more first probe light bands 102 could lie between such second probe light bands.

Similarly, for some embodiments, it may be desirable to generate and launch into the sensing optical fibre 22 first probe light pulses which are not all of the same wavelength, and to this end there may be multiple distinct first probe light bands 102 within which first probe light pulses are generated. Some practical uses of such multiple first probe light bands are discussed further below. To this end, although FIG. 1 depicts the first probe light source 30 as comprising one first laser 36, it may instead comprise more than one first laser 36 (depicted in FIG. 1 as 36, 36') with each such first laser being used to generate first light pulses of a different wavelength. In other arrangements, a single first laser 36, or each of multiple first lasers 36, 36' may be used to generate first probe light pulses of different wavelengths using suitable tuning techniques.

If first and/or second probe light pulses of multiple different wavelengths are used as outlined above, then these may still be combined using a single wavelength combiner component 44, and all of the pulses may still be conditioned using the conditioning components 50, as discussed above. Detection of the increased number of different wavelengths will preferably still take place separately and simultaneously in order to achieve the advantages outlined above and if relevant as described in WO2012/063066, and to this end at least a further filter and associated photodetector may be provided in the receiver for each such additional wavelength used.

Where just one or multiple wavelengths are used for the second probe light pulses, it may be desirable to tune such wavelength(s) to optimise response characteristics of the coherent Rayleigh detection for example to adjust phase biases between the detected interference from different wavelengths as discussed in WO2012/063066. To this end, as shown in FIG. 1 the distributed optical fibre sensor 10 may comprise a reference coil 86 which can be forced with a known physical or acoustic forcing. The reference coil could for example comprise a length of the sensing optical fibre 22, and could be wrapped around a piezoelectric drum 88. This arrangement could be located within, or external to the analyser 20. A wavelength control element 90 receives coherent Rayleigh backscatter signals arising from the forcing on this part of the sensing fibre, for example from the analyser 84, and uses these backscatter signals to adjust one or more wavelengths of second probe light pulses through suitable tuning control of the one or more second lasers 36, 36'.

The reference coil 86 may also usefully provide a temperature reference function as described later in this document.

Control of timing of generation and/or modulation, and therefore also of launch into the sensing optical fibre 22, of each of the first and second probe light pulses 38, 40 may be achieved using a timing controller 92, which controls each of the first and second probe light sources 30, 34. The timing controller 92 may send related timing signals to the analyser 84 to assist in analysis of the detected backscattered light, and may receive signals from the analyser, for example based on the detected backscattered light, to assist in maintaining appropriate timing of the first and second probe light sources.

The timing controller 92 may control the first and second probe light sources such that first and second probe light pulses do not overlap in the wavelength combiner 44, optical conditioning elements 50, circulator 60 or other aspects of the interrogator 20, and do not overlap during launch into or propagation within the sensing optical fibre 22. This measure prevents the occurrence of non-linear optical interactions between the first and second light pulses, which may otherwise particularly be a problem for example due to the relatively high peak power desirable for at least the first probe light pulses to provide adequate signal to noise ratio from the Raman scattering, and the high degree of sensitivity of the coherent Rayleigh backscatter measurements to any phase disturbance to the second probe light pulses.

In order to optimise the duty cycle of the distributed optical fibre sensor and obtain optimum rates of measurement, optimum signal to noise ratios, or a balance of these aspects, it is desirable for at least backscatter from each of the first and second probe light pulses 38, 40 to coexist in the sensing optical fibre 22, and more preferably for both first and second probe light pulses to coexist and propagate along the sensing optical fibre at the same time, and for these reasons the receiver 70 as discussed above is preferably arranged to separately and simultaneously detect backscatter from both the first and second probe light pulses.

In practice, to avoid the above undesirable non-linear optical interactions between first and second probe light pulses, only a very minimal timing gap between the respective pulses in the sensing optical fibre is required, for example with a clear gap in timing between the end of one pulse and the start of the next of a few nanoseconds to a few tens of nanoseconds being adequate.

As touched on above, the scattering cross section for Raman scattering in the sensing optical fibre 22 is relatively small, so that to achieve adequate signal to noise ratio to make good temperature determinations as functions of position along the sensing fibre 22, integration times of at least tens of seconds may sometimes be required in prior art arrangements. To improve signal to noise ratio and/or reduce such integration times, pulse coding of the first probe light pulses may be used in which a series of first probe light pulses is generated in quick succession so as to be present in the sensing optical fibre at the same time as each other, with particular pulse coding in the form of controlled intervals or spacings between the pulses. This increases the total energy of probe light pulses present in the optical fibre and therefore the total backscatter energy, but the backscatter profile as a function of distance along the fibre can still be recovered with a distance resolution comparable to the length in the fibre of a single first probe light pulse, by suitable decoding of the received backscatter with reference to the pulse coding of the transmitted first probe light pulses.

Some examples of such pulse coding for use in OTDR techniques are provided for example in Liao et al., *Optics Express*, vol. 27, issue 2, 2019, and include the use of linear combination codes such as Simplex coding, and correlation codes such as Golay coding. Codes comprising several tens or hundreds of bits (where each bit is typically either presence or absence of a pulse at a particular location with the code) may be used, for example code sequences comprising at least 64, at least 128, or at least 256 bits, or codes which when transmitted comprise at least 50 or at least 100 probe light pulses. Typical duty cycles between bits (whether represented by a probe light pulse or the lack of a pulse) and spaces between the bits may typically be of the order of 10% to 90%, for example around 50%. Where the duty cycle is less than 100%, with spaces between the bits, this may be termed a "return-to-zero" arrangement, where this refers to a "zero" between each bit which is a neutral or rest position. The length of each such first probe light pulse is related to the spatial resolution required of the measurement to be made, and the required signal to noise ratio which typically improves for longer pulses. Individual pulse lengths in the region of one to a hundred metres may typically be used.

Embodiments of the invention may therefore implement pulse code modulation of the first probe light pulses, as outlined above, in which one or more code sequences of first probe light pulses are launched into the sensing optical fibre 22, and in which the sensor is arranged to reconstruct the detected Stokes and anti-Stokes shifted components of the backscattered probe light as functions of position along the path, using decoding of the pulse code modulation. In FIG. 1, this is achieved using a pulse code source 94 which provides one or more pulse code modulation sequences to the timing controller 92 for corresponding modulation control of the first probe light source 30, and to the analyser 84 for the purposes of pulse code demodulation using a decoder element 122 which receives the Stokes and anti-Stokes signals S, S' from the receiver 70. The output of the decoder 122 then comprises a Stokes signal and anti-Stokes signal each of which are functions of position along the sensing optical fibre.

Pulse code modulation of the first probe light source 30 may be achieved by switching the first laser 32 on and off at suitable times, or by using a separate first modulator 33 typically comprised in the first probe light source 30, or both. Such a first modulator may for example be provided by an acousto-optic modulator, a semiconductor optical amplifier, or an electro-optic modulator.

Suitable pulse timing and shaping of the second probe light pulses may also be controlled at least partly by the timing controller. Typically, each second probe light pulse 40 may be generated at an appropriate time as a pulse by the second laser source 36, but then further shaped using a high extinction modulator 37, such as an acousto-optic modulator or a semiconductor optical amplifier, provided as part of the second probe light source. Various different pulse shapes and modulation schemes may be used for each second probe light pulse. For example, pulses may be essentially rectangular, or of more complex shape such as the double peak form discussed in WO2006/048647. Other modulation schemes which may be used include frequency chirped pulses for example as described in Pastor-Graells et al., *Optics Express* 24 (12) 2016, and wavelength stepped pulses for example as described in Koyamada et al., *J. Lightwave Technol.* 27(9) 2009.

The length of each second probe light pulse in the sensing optical fibre may typically be in the range of about 1 to 100 metres, and preferably is arranged to provide a spatial resolution approximately the same as that of the first probe light pulses. This helps to improve the efficacy and performance of analysis techniques described below in which data from the first and second probe light pulses is combined to provide enhanced measures such as temperatures with better time resolution and calibration, or strain measure compensated for temperature.

Maximum repetition rate, if only a single wavelength of second probe light pulses is used, is limited by round trip time within the sensing optical fibre 22, but using multiple different wavelengths as discussed above can allow use of higher repetition rates. Typical repetition rates could lie in the range of around 1 kHz to 1 MHz depending on sensing fibre length and other factors.

Although some embodiments use an optical time domain reflectometry scheme for at least the second probe light pulses, in which round trip time is used to determine the location in the sensing optical fibre from which backscatter originates, optical frequency domain reflectometry techniques may instead or also be used, for example in which a longer chirped pulse is launched into the fibre, and frequency domain analysis is used to relate backscatter and position along the fibre. Such an approach can provide similar benefits to the performance of the reflectometry system as the pulse coding methods described above.

Figure 3:
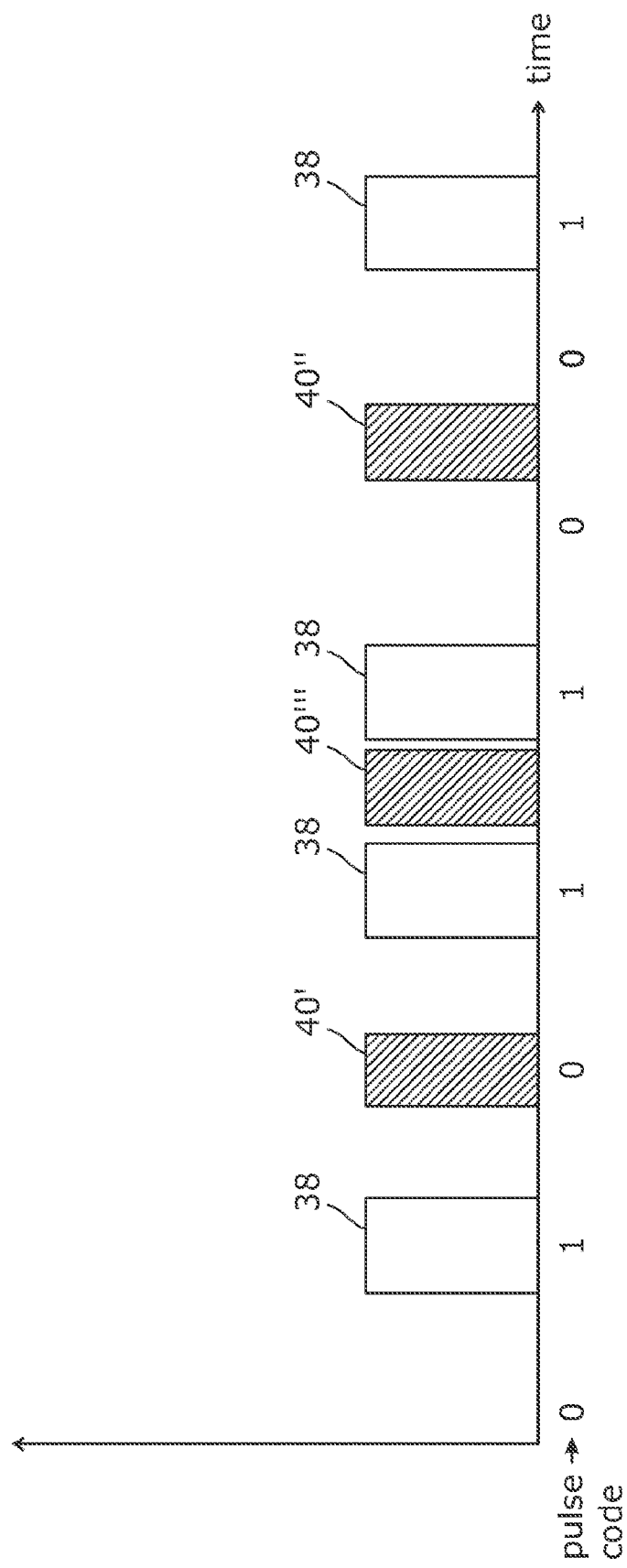
FIG. 3 illustrates pulse coding of the first probe light pulses and some options for launching of first probe light pulses.

FIG. 3 illustrates some ways in which a return-to-zero (RZ) pulse code modulation scheme may be used for the first light pulses, and in which one or more second probe light pulses may be fitted into such a modulation scheme. The horizontal axis of FIG. 3 is a time axis relating to when probe light pulse power is transmitted into the sensing fibre. The vertical axis may be taken to represent transmitted intensity or power of such pulses. First probe light pulses 38 are shown as transmitted in a pulse code which includes the bit sequence 01011001. According to one option, a second probe light pulse 40' is transmitted into the sensing optical fibre 22 at a zero bit in the pulse code, although to provide further spacing it could instead be transmitted as second probe light pulse 40" where two zero bits are adjacent to each other. However, it may not be necessary to transmit a second probe light pulse in a zero bit space, and instead a second probe light pulse 40''' is illustrated as being transmitted between two adjacent bits of the pulse code, and this can be implemented regardless of whether either of the adjacent bits is a one or zero. If multiple second probe light pulses 40 are to be present in the optical fibre at the same time, and are therefore transmitted using different wavelengths for separate detection, multiple second probe light pulses could be interleaved within a pulse code scheme of first probe light pulses, for example using one or more of the above techniques. In other embodiments, second probe light pulses may be transmitted into the sensing optical fibre 22 outside of, that is before and/or after, the bits of a series of pulse coded first pulses.

As illustrated in FIG. 2, Raman Stokes and anti-Stokes bands form an approximately symmetric pattern around the unscattered probe light wavelength, although the Stokes light is more intense than the anti-Stokes light. The actual ratio of intensities of Stokes compared to anti-Stokes light at a corresponding separation from the unscattered probe light wavelength is temperature dependent because the anti-Stokes light is generated solely from vibrationally excited molecules, whereas the Stokes light is generated by molecules in the ground state. The intensity ratio can be approximated using the following formula:

$$\frac{I_{as}}{I_s} \propto e^{\frac{-h v_R c}{k_B T}} \quad (1)$$

where $I_{as}$ and $I_s$ are the intensities of the anti-Stokes and Stokes light respectively, h is Planck's constant, $V_R$ is the Raman wavenumber shift, c is the vacuum velocity of light, $k_B$ is Boltzmann's constant and T is the absolute temperature of the fibre at the scattering location.

The analyser 84 therefore comprises a Raman temperature calculator element 124 arranged to determine and output a Raman temperature signal TR as a function of position along the sensing optical fibre 22, from the corresponding Stokes and anti-Stokes signals output as functions of position along the sensing optical fibre 22 by the decoder 122, for example from ratios of these signals or in some other way. In the arrangement of FIG. 1, the receiver is arranged to detect quite broad wavelength regions of the Stokes and anti-Stokes backscatter, and the Raman temperature detector 124 may therefore determine temperature from a comparison of the corresponding band averaged Stokes and anti-Stokes signals. In other embodiments, analysis of anti-Stokes spectral features alone may be used to derive the temperature signal, in which case detection of Stokes backscatter which is only very weakly temperature dependent may not be required. Determination of temperature from Raman backscatter in optical time domain reflectometer arrangements is discussed for example in Rosolem, J. B. et al., *IEEE Sensors Journal* 17(11) 2017, 3346-3353 and elsewhere in the prior art.

The reference coil 86 shown in FIG. 1 and discussed above for providing wavelength control of the second probe light source may also or instead be used as a temperature reference. If the reference coil is maintained at a controlled temperature, then the Raman spectral signal from this part of the sensing optical fibre can be used to continuously or intermittently calibrate the above calculation of temperature from the Raman backscattered components. Of course separate reference coils could be used for each of the wavelength control and temperature calibration functions, but combining both functions to use a single reference coil is likely to be advantageous in terms of providing a more cost effective and compact interrogator unit.

The analyser may also comprise one or more Rayleigh analysis elements for analysing coherent Rayleigh signals C output by the receiver 70. Such Rayleigh analysis elements may include one or more of a Rayleigh shift element 126, and a Rayleigh vibration element 128 shown in FIG. 1, and such elements may in practice be combined together or share common parts if appropriate.

The second probe light pulses are each sufficiently coherent that the detected backscatter signal is dominated by self-interference between different parts of the backscatter from a pulse. Such techniques are discussed for example in WO2008/056143. The resulting coherent Rayleigh backscatter therefore leads to a temporal speckle pattern of interference fringes at the Rayleigh photodetector 78, and the coherent Rayleigh noise signal C is typically then a time series of intensity of the detected temporal speckle patterns.

The Rayleigh shift element 126 is arranged to determine and output a Rayleigh shift signal φ derived from the coherent Rayleigh noise signal C which is representative of the changes in refractive index in the sensing optical fibre 22 which give rise to the coherent interference pattern, these changes in refractive index being caused by one or both of changes in strain and temperature within the fibre as discussed below. The Rayleigh shift signal could for example be considered in terms of the actual changes in refractive index, or in terms of phase shift of interference fringes in the coherent Rayleigh backscatter which these refractive index changes cause. The generation of the Rayleigh shift signal can be done in various ways, for example by use of phase tracking as discussed in more detail below, or by using particular pulse modulation techniques for example as discussed in Pastor-Graells et al., *Optics Express* 24(12) 2016.

If phase tracking of the coherent Rayleigh noise signal at each of multiple positions along the sensing optical fibre is used, then potential ambiguity in these phase changes can be reduced by tracking the phase changes of second probe light pulses at each of two or more different probe light wavelengths as discussed in WO2012/063066, for example where the different wavelengths are chosen to give rise to phase signals which are approximately orthogonal, for example being π/2 radians out of phase with each other, or which change at differing rates with respect to variation in refractive index, for example through the use of differing pulse widths at the different wavelengths. Other discussions of phase tracking of coherent Rayleigh noise signals in optical time domain reflectometry techniques may be found in "*An introduction to distributed optical fibre sensors*" by Arthur H. Hartog, published by CRC Press, London, 2017, pages 239-256.

If a sufficiently stable second laser source 36 is used then the Rayleigh shift signal φ may be stable and accurately represent absolute properties of the sensing optical fibre over quite long periods, for example over periods of seconds to minutes or hours and potentially longer. However, the analyser may also comprise a Rayleigh vibration element 128 arranged to monitor more rapid changes in the coherent Rayleigh noise signal C. The Rayleigh vibration element 128 may track phase changes in real time, or may use a time series of magnitudes of the coherent Rayleigh noise signal at each position in the sensing optical fibre to output a vibration signal V, which could for example be based directly on the time series of magnitudes, on differences in such magnitudes between successive probe light pulses, or in other ways for example using various filtering techniques. A review of such techniques may be found in "An introduction to distributed optical fibre sensors" by Arthur H. Hartog, published by CRC Press, London, 2017, chapter 6.

The signals representing Raman temperature $T_R$, Rayleigh shift φ, vibration V, and any other signals derived from the detected backscattered light by the analyser may be output directly by the interrogator and/or may be combined in various ways to provide enhanced outputs either by the interrogator itself, or elsewhere for example at a remote computer 85, in real time or at some other time, and so forth. In FIG. 1 the generation of such enhanced outputs is represented by processor 130.

Figure 4B:
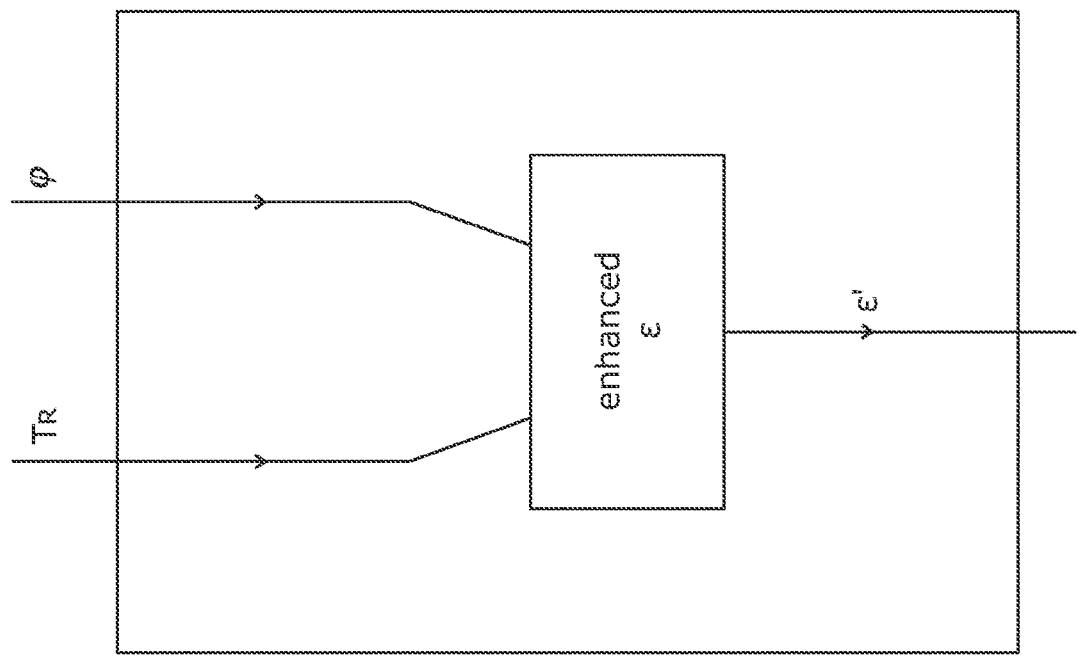
FIGS. 4a and 4b schematically show calculation of enhanced parameters combining data from detected Raman shifted and coherent Rayleigh backscatter.
Figure 4A:
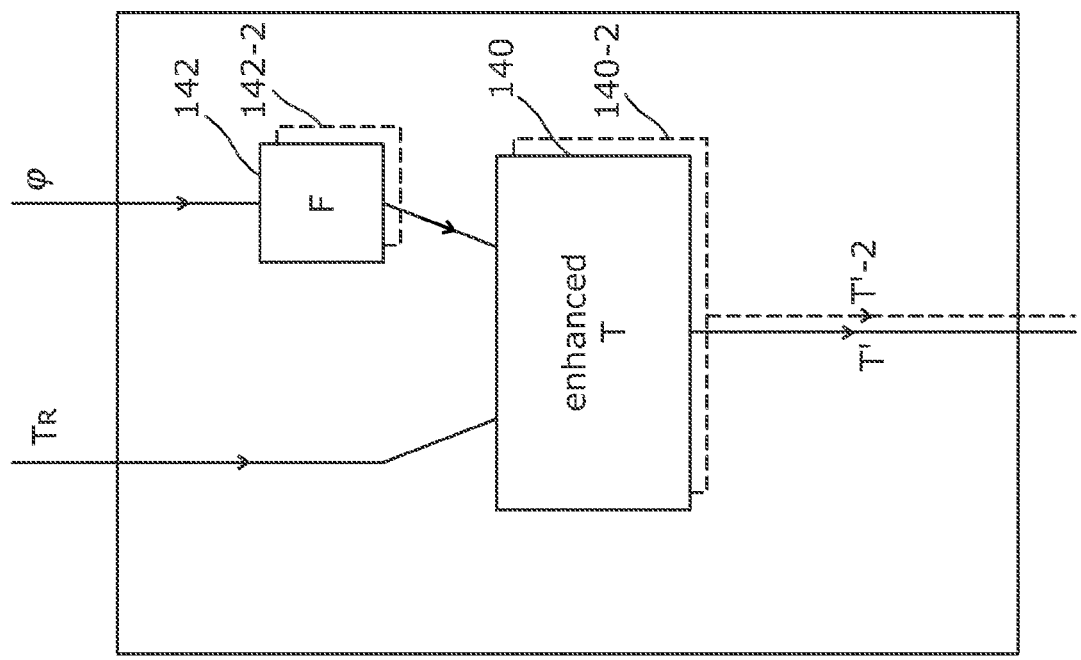

A first optional aspect of the processor 130 illustrated in FIG. 4a is the implementation of an enhanced temperature calculator element 140. The enhanced temperature calculator element 140 accepts as input the Raman temperature signal $T_R$ which has been derived from the Raman Stokes and anti-Stokes signals, and the Rayleigh shift signal φ which has been derived from the coherent Rayleigh noise signal. Because of the weakness of the Raman backscatter in the sensing optical fibre 22, the Raman derived temperature signal $T_R$ typically has a fairly low time resolution, for example of the order of a few seconds to a few tens of seconds. In contrast, the Rayleigh shift signal φ can have a time resolution which corresponds to the repetition time of the second probe light pulses, and even following filtering and averaging a time resolution of the order of one tenth of a second to one second may be suitably provided.

If the Rayleigh shift signal is known to be strongly representative of changes in temperature on such time scales, then this Rayleigh shift can be used by the enhanced temperature calculation element 140 to provide a high time resolution temperature output which is periodically or continuously corrected or calibrated by the lower time resolution Raman derived temperature signal $T_R$ to provide and output an enhanced temperature signal T' with fine time resolution, for example of the order of one tenth of a second to one second, but with improved longer term stability and calibration.

The alternative of providing a temperature signal with such a fine time resolution using the Rayleigh shift signal alone is less desirable because the Rayleigh shift signal can only provide an indication of changes in temperature, whereas the Raman signal provides an indication of absolute temperature. Any temperature derived from the phase shift signal alone therefore is subject to significant drift and calibration issues.

In practical terms, changes in the coherent Rayleigh interference phase shift Δφ for a particular position along the sensing optical fibre result from changes in local strain Δε within the fibre and changes in temperature ΔT of the fibre according to the following formula:

$$\Delta\varphi = k_\varepsilon \Delta\varepsilon + k_T \Delta T \quad (2)$$

where $k_\varepsilon$ and $k_T$ are suitable parameters of phase shift per unit strain and phase shift per unit temperature which are approximately constant over at least small ranges of such changes, but which will also depend on factors such as the probe light pulse length, probe light wavelength, and other factors.

If the sensing optical fibre 22 is deployed within the environment in a manner which reduces or minimises the coupling of strain from the environment to the sensing optical fibre, then Δε will be close to zero, and the main or sole influence on the phase shift will be temperature. For a bare and free moving optical fibre and near infrared probe light the expected phase changes are of the order of minus 100 radians for a probe light pulse length of 10 metres and a 0.1 Kelvin temperature change. In order to provide a suitably strong relationship between temperature and phase shift which is less susceptible to other factors, the sensing optical fibre may therefore be deployed loosely, for example helically wound in a loose tube, which could be gel filled.

To this end, the enhanced temperature calculator element 140 may be arranged to generate a time series of temperature T' at each of one or more positions along the sensing optical fibre 22 by combining lower time resolution determinations of temperature $T_R$, resulting from the detected Stokes and detected anti-Stokes shifted components of the backscattered probe light, with higher time resolution determinations of temperature changes, resulting from said determined Rayleigh shift signal φ. Typically, the lower time resolution determinations of temperature $T_R$ may have a time resolution of longer than one second, or longer than 10 seconds, and the higher time resolution determinations of temperature changes from the Rayleigh shift signal φ may have a time resolution of shorter than one second, or shorter than 0.1 seconds. A combination of the lower time resolution Raman determined temperature $T_R$, and the higher time resolution Rayleigh shift data could for example be implemented using a formula such as:

$$T' = T_R + F(\Delta\varphi/k_T) \quad (3)$$

where F is a high pass filter set to pass frequency components of the phase-based temperature signal which have a time resolution greater than, for example twice, or more than ten times, the time resolution of the Raman based temperature measurements. FIG. 4a therefore also shows the phase shift signal being filtered with high pass filter 142 before being combined with the Raman temperature signal by the enhanced temperature calculator element 140.

In a different approach, the enhanced temperature calculator element 140 may also or instead provide an enhancement of the temperature resolution of the Raman based temperature signal $T_R$. Phase changes of the order of milliradians can typically be resolved using the Rayleigh shift element 126 with a measurement repeat period of the order of milliseconds. Comparing this with a typical phase change of around minus 100 radians for a probe light pulse length of 10 metres and a 0.1 Kelvin temperature change it is clear that milliKelvin temperature resolution or precision may be available from the Rayleigh scatter signal C. On the other hand, Raman based distributed temperature measurements are typically available with a temperature resolution or precision in the range 0.1 to 1 Kelvin with best measurement repeat periods of the order of many seconds. Averaged or low-pass filtered temperature change data derived from the Rayleigh signal C may therefore be added to the calibrated, absolute temperature data $T_R$ from the Raman measurements without necessarily increasing the data or readout rate of the enhanced temperature output signal T', but considerably enhancing the final temperature resolution while maintaining the reliability of absolute temperature calibration.

To this end, the filter F shown in equation 3 above and in FIG. 4a may instead be a low pass filter set to pass frequency components of the phase-based temperature signal which have a time resolution comparable to those of the Raman based temperature measurements, for example no more than twice that time resolution, or of the same time resolution, but which have a substantially higher temperature resolution or precision. For example, the temperature resolution of the Raman based temperature measurements may in practice be no better than 0.1, or 0.5, or 1.0 Kelvin, whereas the temperature resolution of precision of the Rayleigh based temperature change determinations, for example on the same or comparable time resolution basis, may be at or better than 0.1, 0.05 or 0.01 Kelvin.

Also as shown in FIG. 4a, one or more enhanced temperature calculator functions 140, 140-2 may be provided, using corresponding filters 142, 142-2 for the Rayleigh shift signal, in order to provide one or more different enhanced temperature signals T', T'-2 for output as discussed above.

A second optional aspect of the processor 130 which is illustrated in FIG. 4b is the implementation of an enhanced strain calculator element 150. The enhanced strain calculator element 150 accepts as input the Raman temperature signal $T_R$ which has been derived from the Raman Stokes and anti-Stokes signals, and the Rayleigh shift signal 9 which has been derived from the coherent Rayleigh noise signal. If the sensing optical fibre 22 is subject to changes both of strain and temperature imposed by the environment, then equation (2) above can be rearranged to provide a calculation of changes in strain based on:

$$\Delta\varepsilon = (\Delta\varphi - k_T \Delta T)/k\varepsilon \quad (4)$$

Using this relationship, the enhanced strain calculator element 150 calculates a change in strain based on the phase shift signal derived from the coherent Rayleigh backscatter signal C, using the temperature $T_R$ derived from the Raman backscatter signals S, S' to compensate for the effect of temperature on the phase shift. This calculation can be effective to provide an output of change in strain over a time period for which a suitably accurate change in temperature is provided by the Raman temperature signal $T_R$, which may typically be for time periods ranging from a few seconds or a few tens of seconds upwards depending on the time resolution provided with sufficient signal to noise ratio by the Raman based temperature signal $T_R$.

In this way, the analyser is arranged to generate a time series of strain at each of one or more positions along the path, by combining the phase shifts arising from the coherent Rayleigh signal with the temperatures derived from the Stokes and anti-Stokes backscatter. For a near infrared probe light the expected phase changes are of the order of 50 radians for a probe light pulse length of 10 metres and a strain change of 1 microstrain.

In order for calculations of change in strain produced by the enhanced strain calculator element 150 to be plausible, the sensing optical fibre should be suitably coupled to the environment to permit strain from the environment to be transmitted to the fibre. This could be achieved in a variety of ways for example by fixing the sensing optical fibre 22 within a resin or other filler within a conduit or cable affixed to a structure such as a pipeline or building, by setting the sensing optical fibre 22 within a tightly fitting cable which is itself set within cement or another rigid filling material along a well bore, or in other ways.

If calculating strain in this way from the coherent Rayleigh backscatter, compensated for temperature changes using the Raman signal, the coherent Rayleigh backscatter can still be used for other purposes at the same time, for example to determine acoustic vibration using the Rayleigh signal at shorter timescales.

Propagation characteristics of light along an optical fibre such as attenuation vary with wavelength, and these changes in attenuation are themselves subject to other factors such as strain and temperature so can be difficult to compensate for. It will be noted that in FIG. 2 the Stokes 106 and anti-Stokes 108 shifted components of the backscattered probe light are spaced quite widely in wavelength, with the spacing being of the order of 200 nm for probe light in the near infrared. Over a few tens of metres, the different attenuation characteristics for the Stokes and anti-Stokes components are likely to be too small to be worth attending to, but for a sensing optical fibre of hundreds or thousands of metres in length, these attenuation characteristics can introduce significant systematic errors into the temperature $T_R$ derived from the Raman backscatter.

Figure 5:
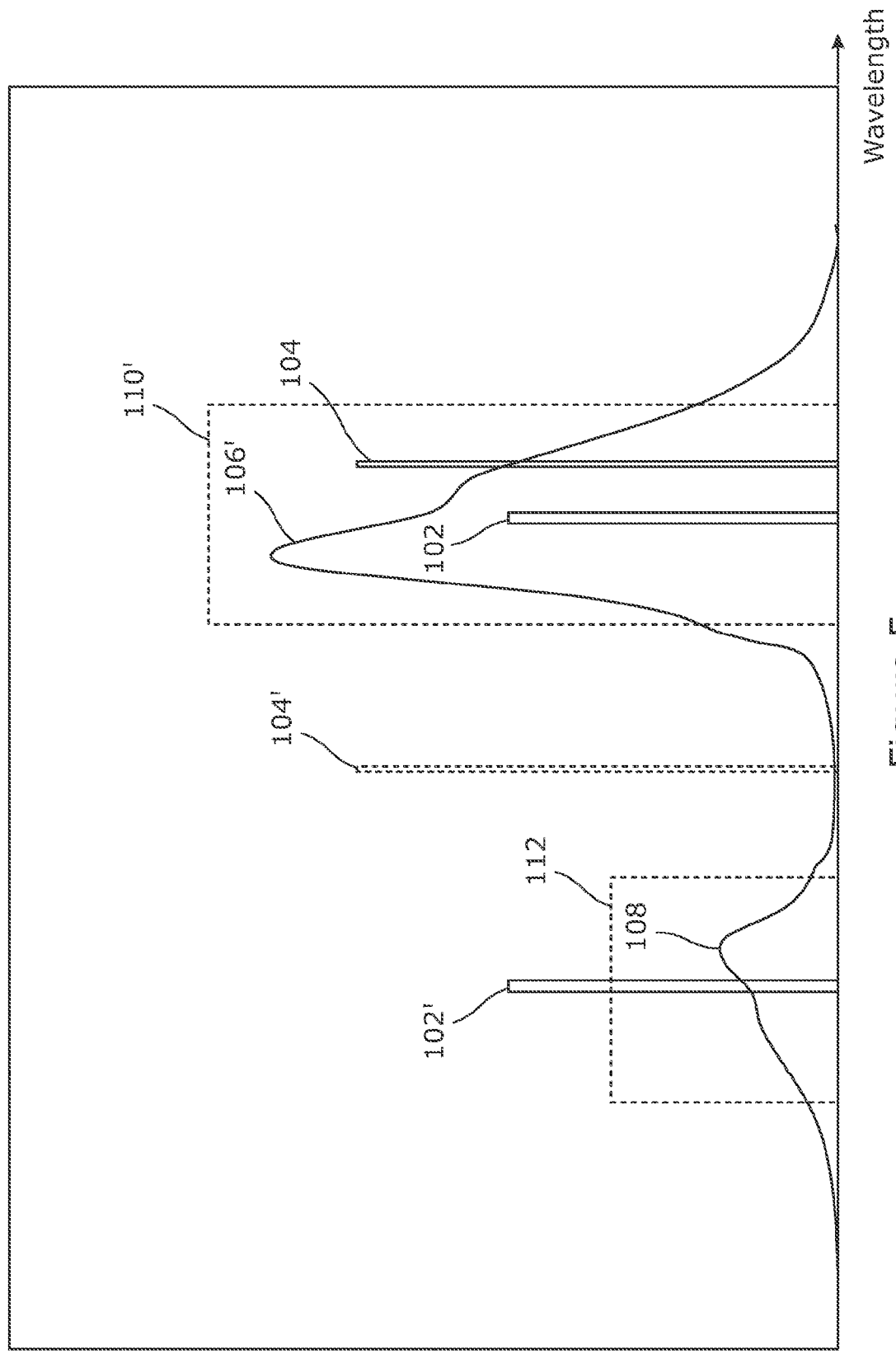
FIG. 5 shows an alternative wavelength scheme in which Stokes shifted and anti-Stokes shifted backscatter wavebands each coincide with the wavebands of the probe light pulses used to generate the other, to thereby reduce or eliminate the effects of differential attenuation at different wavelengths during propagation of light along the sensing optical fibre.

FIG. 5 shows how the wavelength scheme depicted in FIG. 2 can be modified to reduce the effect of such differential Stokes and anti-Stokes attenuation on the Raman derived temperature signal $T_R$. According to this wavelength scheme, the first probe light source 30 is used to generate pulses 38 of first probe light in two, separated, first wavelength bands 102 and 102', referred to here as first and second of the first wavelength bands. The first of these bands 102 corresponds to that already depicted in FIG. 2, and gives rise to anti-Stokes shifted components 108 in the backscattered light, which can be detected as already discussed above for example using a suitable bandpass filter in the receiver 70, represented in FIG. 5 by bandpass region 112. As for FIG. 2, the vertical axis may represent intensity or power, but noting that the intensity of the Stokes and anti-Stokes backscattered light will be many orders of magnitude less than that of the probe light transmitted in bands 102, 102', 104 and 104', even though for convenience these are illustrated in the same figure A second of the first wavelength bands, labelled in FIG. 5 as 102', is provided at a significantly shorter wavelength than the first of the bands 102, at a wavelength which is coincident with or proximal to the anti-Stokes bandpass region 112. For example, the second of the first wavelength bands may lie within, overlap with, or be spaced by less than 40 or less than 20 nanometers in wavelength from, the anti-Stokes bandpass region 112.

The Stokes shifted backscattered components 106' arising from first probe light pulses of the second of the first wavelength bands 102' then approximately coincide with the first one of the first wavelength bands 102. The Stokes-shifted components 106' can then be detected using a bandpass filter in the receiver 70 represented in FIG. 5 by Stokes bandpass region 110', where the first of the first wavelength bands 102 is coincident with or proximal to the Stokes bandpass region 110', for example lying within, overlapping with, or being spaced by less than 40 or less than 20 nanometers in wavelength from the Stokes bandpass region 110'.

In this way, the attenuation characteristics of the outward path of probe light pulses of the first of the first wavelength bands 102 in combination with the characteristics of the return path of Raman backscatter within the anti-Stokes bandpass region 112, approximately matches the attenuation characteristics of the outward path of probe light pulses of the second of the first wavelength bands 102' in combination with the characteristics of the return path of Raman backscatter within the Stokes bandpass region 110. This balancing of the attenuation characteristics between the Stokes and anti-Stokes measurements therefore gives rise to a more accurate and stable temperature determination, for example in the form of Raman temperature signal $T_R$.

Probe light pulses of each of the first and second of the first wavelength bands are preferably launched to maximise the rate of light pulses of each, so as to avoid a significant reduction in the readout rate of the Raman detection and consequent reduction in time resolution of the calculated Raman temperature. For example, the probe light pulses of each of the first and second of the first wavelength bands may be launched at least such that backscattered light from each waveband is present in the sensing optical fibre at the same time. Because the first and second of the first wavelength bands 102, 102' are widely spaced in wavelength, pulses of each may be launched at the same time, or in close proximity. If pulse code modulation is used for each of the first wavelength bands, the trains of pulses launched according to the codes may overlap or be interleaved. The use of different pulse codes in this way also enables better separation of the Raman signal from any Rayleigh scattered signal to be detected within one of the Raman bandpass detection regions, for example in FIG. 5 avoiding Rayleigh backscatter from second wavelength band 104 from interfering with Stokes measurement in region 110'.

In another alternative arrangement, the first and second of the first wavelength bands 102, 102' may be spaced even further apart in wavelength such that the Stokes and anti-Stokes shifted backscattered and detected components are coincidental or overlap in wavelength with each other, which in the context of FIG. 5 would be represented by the Stokes and anti-Stokes wavebands 110' and 112 being coincident or overlapping. In such an arrangement, conveniently the same filter and detector may be used for selecting both the Stokes and anti-Stokes components in the receiver, for example just a single filter 72 or 73 could be used to select, and just a single photodetector 76 or 77 used to detect, both of the Raman components. However, in this case, further measures would be needed to be able to separately detect both of the Stokes and anti-Stokes components. In one such technique, the timing controller 92 could be arranged such that the first probe light pulses of the first of the first wavelength bands and first probe light pulses of the second of the first wavelength bands are transmitted into the sensing optical fibre at sufficiently different times that backscattered light from each of the first and second ones of the first wavelength bands does not overlap at the receiver. In another such technique, light of each of the first and second of the first wavelength bands may be present in the sensing optical fibre at the same time, but each transmitted using a different modulation pulse code such that they can be separated after detection by suitable decoding.

If using a wavelength scheme as illustrated in FIG. 5, the first and second of the first wavebands are likely to be separated by the order of 100 nanometres, which will frequently be too wide a spacing for all of the common conditioning elements to be used for both of the wavebands 102, 102'. In particular, if an erbium doped fibre amplifier is used as a common component for one or more of the second wavebands used for Rayleigh detection, and one of the first wavebands 102, 102', it is unlikely to be possible to use it for the other of the first wavebands because of the large wavelength spacing, and the same may apply for others of the common conditioning elements. In such cases, the interrogator may be provided with a separate pathway for at least some of the path between the first probe light source 30 and the circulator for one of the first wavebands 102, 102'. For example, the one of the first wavebands further in wavelength from the second wavebands could bypass the wavelength combiner 44 and common conditioning elements 50, to be multiplexed with the other wavebands at a further wavelength multiplexer located between the common conditioning elements 50 and the circulator 60.

Because the anti-Stokes backscatter from the sensing optical fibre is typically around an order of magnitude weaker than that of the Stokes backscatter, it may be preferable for the second of the first wavebands 102' to be the one which bypasses the common conditioning elements, since the increased levels of backscatter may allow less amplification of the probe light pulses to be used, and therefore require less restrictive conditioning requirements.

Although in FIG. 5 the second waveband 104 used for second probe light pulses and detection of coherent Rayleigh backscatter is located proximally to the first one 102 of the first wavebands, this is not required, and it could instead be located proximally to the second one 102' of the first wavebands, more centrally between the two wavebands as shown by second waveband 104' in the figure, or elsewhere, and common optical conditioning components may be used or not on the various wavebands accordingly subject to adequate proximity in wavelength.

Although particular embodiments of the invention have been described, it will be apparent to the skilled person that various modifications and alterations can be made without departing from the scope of the invention.

The invention claimed is:

1. A distributed optical fibre sensor for measuring one or more parameters as functions of position along a sensing optical fibre that extends along a path through an environment, comprising:
   a first probe light source arranged to generate pulses of first probe light in one or more first wavelength bands;
   a second probe light source arranged to generate pulses of second probe light in one or more second wavelength bands separate from said one or more first wavelength bands;
   a wavelength division multiplexer arranged to launch the first probe light pulses and the second probe light pulses into the sensing optical fibre for backscatter within the sensing optical fibre; and a receiver arranged to receive a backscattered probe light from the sensing optical fibre, and separately detect both Raman Stokes and Raman anti-Stokes shifted components of the backscattered probe light, and coherent Rayleigh backscattered components of the second probe light, the receiver comprising:
one or more Rayleigh wavelength filters arranged to select the backscattered probe light in the one or more second wavelength bands,
a Raman Stokes wavelength filter arranged to select the Raman Stokes shifted components of the backscattered probe light, and
an anti-Stokes wavelength filter arranged to select the Raman anti-Stokes shifted components of the backscattered probe light.

2. The distributed optical fibre sensor of claim 1, arranged to determine optical phase shifts in the coherent Rayleigh backscattered components of the second probe light.

3. The distributed optical fibre sensor of claim 2, arranged to determine acoustic vibration as a function of position along the path, from the determined optical phase shifts.

4. The distributed optical fibre sensor of claim 1, arranged to determine temperature as a function of position along the path, from the detected Raman shifted components of the backscattered probe light.

5. The distributed optical fibre sensor of claim 1 further comprising an optical circulator, wherein the first and second probe light pulses are launched into the sensing optical fibre from the wavelength division multiplexer through the optical circulator, and backscattered components of the first and second probe light pulses backscattered within the sensing optical fibre are received at the receiver through the optical circulator.

6. The distributed optical fibre sensor of claim 5 further comprising one or more optical conditioning elements, each optical conditioning element being arranged to condition both the first probe light pulses and the second probe light pulses passing from the wavelength division multiplexer to the optical circulator.

7. The distributed optical fibre sensor of claim 6 wherein the optical conditioning elements comprise one or more of: an erbium doped fibre amplifier; and an optical filter.

8. The distributed optical fibre sensor of claim 1 wherein the receiver comprises:
one or more Rayleigh photodetectors arranged to detect said selected backscattered probe light in said second wavelength bands; and
one or more corresponding Raman photodetectors arranged to detect said selected Raman Stokes and Raman anti-Stokes shifted components.

9. The distributed optical fibre sensor of claim 8 wherein the one or more corresponding Raman photodetectors comprise a Stokes photodetector arranged to detect said selected Raman Stokes shifted components and an anti-Stokes photodetector arranged to detect said selected Raman anti-Stokes shifted components.

10. The distributed optical fibre sensor of claim 1 wherein the first probe light source and the second probe light source comprise respective one or more first lasers and one or more second lasers.

11. The distributed optical fibre sensor of claim 1 wherein at least one of the one or more first wavelength bands are separated from the one or more second wavelength bands by less than 50 nm.

12. The distributed optical fibre sensor of claim 1 wherein the bandwidth of each of the first probe light pulses is at least one of: at least 100 MHz; and at least 1 GHz.

13. The distributed optical fibre sensor of claim 1 wherein the bandwidth of each of the second probe light pulses is at least one of: less than 10 MHZ; and less than 1 MHz.

14. The distributed optical fibre sensor of claim 1 wherein a peak power of each first probe light pulse is at least 1 Watt and a peak power of each second probe light pulse is less than 500 milliwatts.

15. The distributed optical fibre sensor of claim 1 arranged such that backscattered first probe light and backscattered second probe light coexist within the sensing optical fibre.

16. The distributed optical fibre sensor of claim 1 arranged such that the first and second probe light pulses do not overlap during launch into the sensing optical fibre.

17. The distributed optical fibre sensor of claim 1 arranged to provide pulse code modulation of the first probe light source so as to launch one or more code sequences of the first probe light pulses into the sensing optical fibre, and to reconstruct the detected Raman Stokes and Raman anti-Stokes shifted components of the backscattered probe light as functions of position along the path using decoding of the pulse code modulation.

18. The distributed optical fibre sensor of claim 17 wherein each of the one or more code sequences comprises at least 50 pulses of the first probe light.

19. The distributed optical fibre sensor of claim 17 arranged to launch into the sensing optical fibre at least one pulse of the second probe light between pulses of said code sequences of the first probe light.

20. The distributed optical fibre sensor of claim 1 wherein the receiver is arranged to separately and simultaneously detect both the Raman Stokes shifted components of the backscattered probe light and the Raman anti-Stokes shifted components of the backscattered probe light.

21. The distributed optical fibre sensor of claim 1 wherein the detected Raman Stokes shifted components of the backscattered probe light, and the detected Raman anti-Stokes shifted components of the backscattered probe light arise from the same pulses of the first probe light or from the first probe light of the same first wavelength band.

22. The distributed optical fibre sensor of claim 1 wherein the one or more first wavelength bands comprise both first and second first wavelength bands, and wherein the receiver is arranged to detect the Raman anti-Stokes shifted components of the backscattered probe light arising from probe light pulses of only the first of the one or more first wavelength bands, and wherein the receiver is arranged to detect the Raman Stokes shifted components of the backscattered light arising from probe light pulses of only the second of the one or more first wavelength bands.

23. The distributed optical fibre sensor of claim 22 wherein the detected Raman anti-Stokes shifted components of the backscattered probe light and the second of the one or more first wavelength bands are coincident in or overlap in wavelength, or are separated in wavelength by less than 20 nanometres.

24. The distributed optical fibre sensor of claim 22 wherein the detected Raman Stokes shifted components of the backscattered probe light and the first of the one or more first wavelength bands are coincident in or overlap in wavelength, or are separated in wavelength by less than 20 nanometres.

25. The distributed optical fibre sensor of claim 22 wherein the first probe light pulses of the first of the one or more first wavelength bands and the first probe light pulses of the second of the one or more first wavelength bands are transmitted into the sensing optical fibre such that backscattered light from each of the first and second of the one or more first wavelength bands is present in the sensing optical fibre at the same time.

26. The distributed optical fibre sensor of claim 22 wherein one or more common optical conditioning elements are arranged to condition the first probe light pulses and the second probe light pulses passing from the wavelength division multiplexer to sensing optical fibre, and the one or more common optical conditioning components are arranged to condition the first probe light pulses in only one of the first and second of the one or more first wavelength bands, with separate optical conditioning components being arranged to condition the first probe light pulses in the other one of the first and second of the one or more first wavelength bands.

27. The distributed optical fibre sensor of claim 26 wherein the separate optical conditioning elements are arranged to condition the first probe light pulses in the second one of the one or more first wavelength bands used for detection of the Raman Stokes shifted components.

28. The distributed optical fibre sensor of claim 1 further comprising an analyser arranged to determine temperature as a function of position along the path from the detected Raman Stokes and Raman anti-Stokes shifted components of the backscattered probe light.

29. The distributed optical fibre sensor of claim 28 wherein the analyser is arranged to determine temperature as a function of position along the path from combinations of the detected Raman Stokes and detected Raman anti-Stokes shifted components of the backscattered probe light.

30. The distributed optical fibre sensor of claim 28 wherein the analyser is arranged to determine acoustic vibration as a function of position along the path from the coherent Rayleigh backscattered components of the second probe light.

31. The distributed optical fibre sensor of claim 28 wherein the analyser is arranged to determine optical phase shifts in the coherent Rayleigh backscattered components of the second probe light as a function of position along the path.

32. The distributed optical fibre sensor of claim 28 wherein the analyser is arranged to generate a time series of temperature at each of a plurality of positions along the path by combining lower time resolution determinations of temperature, determined from said detected Raman Stokes and Raman anti-Stokes shifted components of the backscattered probe light, with higher time resolution determinations of temperature changes, determined from the coherent Rayleigh backscattered components of the second probe light.

33. The distributed optical fibre sensor of claim 32 wherein the lower time resolution determinations of temperature have a time resolution of longer than one second, or longer than 10 seconds, and the higher time resolution determinations of temperature changes have a time resolution of shorter than one second, or shorter than 0.1 seconds.

34. The distributed optical fibre sensor of claim 28 wherein the analyser is arranged to generate a time series of temperature at each of a plurality of positions along the path by combining lower temperature resolution determinations of temperature, determined from said detected Raman Stokes and Raman anti-Stokes shifted components of the backscattered probe light, with higher temperature resolution determinations of temperature changes, determined from the coherent Rayleigh backscattered components of the second probe light.

35. The distributed optical fibre sensor of claim 34 wherein the lower resolution determinations of temperature have a temperature resolution of no better than 0.5 Kelvin, or no better than 0.1 Kelvin, and the higher temperature resolution determinations of temperature changes have a precision of better than 0.1 Kelvin, or better than 0.05 Kelvin.

36. The distributed optical fibre sensor of claim 28 wherein the analyser is arranged to generate a time series of strain at each of a plurality of positions along the path, by using said coherent Rayleigh backscattered components of the second probe light with said determinations of temperature which result from said detected Raman Stokes and Raman anti-Stokes shifted components of the backscattered probe light.

37. The distributed optical fibre sensor of claim 28 wherein the analyser is arranged to determine strain as a function of position along the path from optical phase shifts in the coherent Rayleigh backscattered components of the second probe light, wherein the determination of strain is compensated for effect of temperature on the optical phase shifts using the temperature determined from the detected Raman Stokes and Raman anti-Stokes shifted components of the backscattered probe light.

38. The distributed optical fibre sensor of claim 1 further comprising said sensing optical fibre.

39. A method of measuring one or more parameters as functions of position along a sensing optical fibre that extends along a path through an environment, comprising:
using a first probe light source to generate pulses of first probe light in one or more first wavelength bands;
using a second probe light source to generate pulses of second probe light in one or more second wavelength bands separate from said one or more first wavelength bands;
launching the first probe light pulses and the second probe light pulses into the sensing optical fibre for backscatter within the sensing optical fibre;
receiving the backscattered probe light from the sensing optical fibre; and
separately detecting both Raman Stokes and Raman anti-Stokes shifted components of the backscattered probe light, and coherent Rayleigh backscattered components of the second probe light, including:
using one or more Rayleigh wavelength filters to select the backscattered probe light in the one or more second wavelength bands,
using a Raman Stokes wavelength filter to select Raman Stokes shifted components of the backscattered probe light, and
using an anti-Stokes wavelength filter to select Raman anti-Stokes shifted components of the backscattered probe light.

40. The method of claim 39 further comprising determining optical phase shifts in the coherent Rayleigh backscattered components of the second probe light.

41. The method of claim 39 further comprising using a single optical conditioning element to condition the first probe light pulses and the second probe light pulses before launch into the sensing optical fibre, wherein the optical conditioning element is an optical fibre amplifier.

42. The method of claim 39 wherein the bandwidth of each of the first probe light pulses is at least one of: at least 100 MHz and at least 1 GHz, and the bandwidth of each of the second probe light pulses is at least one of: less than 10 MHz and less than 1 MHz.

43. The method of claim 39 wherein backscattered first probe light and backscattered second probe light coexist within the sensing optical fibre, and the first and second probe light pulses do not overlap during launch into the sensing optical fibre.

44. The method of claim 39 comprising separately and simultaneously detecting both the Raman Stokes shifted components of the backscattered probe light and the Raman anti-Stokes shifted components of the backscattered probe light, wherein the detected Raman Stokes shifted components of the backscattered probe light, and the detected Raman anti-Stokes shifted components of the backscattered probe light arise from the same pulses of the first probe light or from the first probe light of the same first wavelength band.

45. The method of claim 39 wherein the one or more first wavelength bands comprise both first and second first wavelength bands, and the method comprises detecting the Raman anti-Stokes shifted components of the backscattered probe light arising from probe light pulses of only the first of the one or more first wavelength bands, and detecting the Raman Stokes shifted components of the backscattered probe light arising from probe light pulses of only the second of the one or more first wavelength bands.

46. The method of claim 45 wherein the second of the one or more first wavelength bands falls within or overlaps with a wavelength range of the detected Raman anti-Stokes shifted components of the backscattered probe light, and the first of the one or more first wavelength bands falls within or overlaps with a wavelength range of the detected Raman Stokes shifted components of the backscattered probe light.

47. The method of claim 39 further comprising determining temperature as a function of position along the path from the detected Raman Stokes and Raman anti-Stokes shifted components of the backscattered probe light.

48. The method of claim 47 further comprising using both the detected Raman Stokes and Raman anti-Stokes shifted components and the detected coherent Rayleigh backscatter components to determine an enhanced parameter as a function of position along the sensing optical fibre.

49. The method of claim 48 wherein the enhanced parameter is an enhanced measure of temperature combining lower time resolution or lower temperature resolution determinations of temperature, determined from said detected Raman Stokes and Raman anti-Stokes shifted components of the backscattered probe light, with higher time resolution or higher temperature resolution determinations of temperature changes, determined from the coherent Rayleigh backscattered components of the second probe light.

50. The method of claim 48 wherein the enhanced parameter is an enhanced measure of strain, determined from said coherent Rayleigh backscattered components of the second probe light, combined with detected Raman Stokes and Raman anti-Stokes shifted components of the backscattered probe light representative of temperature.

* * * * *